(12) United States Patent
Abhishek Raja

(10) Patent No.: US 12,093,692 B2
(45) Date of Patent: Sep. 17, 2024

(54) APPARATUS AND METHOD WITH PREDICTION FOR LOAD OPERATION

(71) Applicant: Arm Limited, Cambridge (GB)

(72) Inventor: . Abhishek Raja, Niagara Falls, NY (US)

(73) Assignee: Arm Limited, Cambridge (GB)

(*) Notice: Subject to any disclaimer, the term of this patent is extended or adjusted under 35 U.S.C. 154(b) by 40 days.

(21) Appl. No.: 18/109,297

(22) Filed: Feb. 14, 2023

(65) Prior Publication Data

US 2023/0185573 A1    Jun. 15, 2023

Related U.S. Application Data

(63) Continuation-in-part of application No. 17/670,762, filed on Feb. 14, 2022, now Pat. No. 11,948,013, which is a continuation-in-part of application No. 17/208,130, filed on Mar. 22, 2021, now Pat. No. 11,513,966.

(51) Int. Cl.
*G06F 9/38* (2018.01)
*G06F 9/30* (2018.01)

(52) U.S. Cl.
CPC ........ *G06F 9/3806* (2013.01); *G06F 9/30043* (2013.01); *G06F 9/3842* (2013.01)

(58) Field of Classification Search
CPC ............... G06F 9/30087; G06F 9/3832; G06F 9/3834; G06F 9/3838; G06F 9/3861; G06F 9/30043; G06F 9/3806; G06F 9/505; G06F 9/384; G06F 9/3842; G06F 9/3856; G06N 5/02

USPC .......................................... 711/118; 712/239
See application file for complete search history.

(56) References Cited

U.S. PATENT DOCUMENTS

| | | | |
|---|---|---|---|
| 11,513,966 B2 | 11/2022 | Abhishek Raja | |
| 2017/0041431 A1* | 2/2017 | Liddicott | ............ H04L 67/5651 |
| 2020/0394040 A1* | 12/2020 | Kothinti Naresh | ... G06F 9/3826 |
| 2021/0026632 A1 | 1/2021 | Dooley et al. | |
| 2021/0089319 A1* | 3/2021 | Liu | ........................ G06F 9/3842 |
| 2021/0157597 A1 | 5/2021 | Grubisic | |
| 2022/0027467 A1 | 1/2022 | Favor | |

(Continued)

OTHER PUBLICATIONS

Office Action dated Aug. 7, 2023 for U.S. Appl. No. 17/670,762, 23 pages.
U.S. Appl. No. 17/670,762, filed Feb. 14, 2022, Abhishek Raja.

*Primary Examiner* — Hashem Farrokh
(74) *Attorney, Agent, or Firm* — NIXON & VANDERHYE P.C.

(57) ABSTRACT

An apparatus has processing circuitry, load tracking circuitry and load prediction circuitry. It is determined whether tracking information indicates that there is a risk of target data, corresponding to an address of a speculatively-issued load operation which is speculatively issued (bypassing an older operation) based on a prediction determined by the load prediction circuitry, having changed between the target data being loaded for the speculatively-issued load operation and data being loaded for a given older load operation bypassed by the speculatively-issued load operation. If so, independent of whether the addresses of the speculatively-issued load operation and the given older load operation correspond, at least the speculatively-issued load operation is reissued, even when the prediction is correct. This protects against ordering violations.

19 Claims, 16 Drawing Sheets

(56) References Cited

U.S. PATENT DOCUMENTS

2022/0067154 A1     3/2022    Favor
2022/0137977 A1     5/2022    Kothinti Naresh et al.

\* cited by examiner

APPARATUS AND METHOD WITH PREDICTION FOR LOAD OPERATION

This application is a continuation-in-part of U.S. application Ser. No. 17/670,762 filed on Feb. 14, 2022, which is itself a continuation-in-part of U.S. application Ser. No. 17/208,130 filed on Mar. 22, 2021. The entire contents of both earlier applications are hereby incorporated by reference.

BACKGROUND

Technical Field

The present technique relates to the field of data processing.

Technical Background

A data processing apparatus may support load operations for loading data from a data store. The apparatus may support load prediction circuitry for making a prediction for a load operation.

SUMMARY

At least some examples provide an apparatus comprising: processing circuitry to issue load operations to load data from a data store; load tracking circuitry to maintain tracking information for one or more load operations issued by the processing circuitry; and load prediction circuitry to determine a prediction for enabling a load operation to be speculatively issued ahead of an older load operation based on the prediction before it is known whether the prediction is correct; in which: the load tracking circuitry is configured to: determine whether the tracking information indicates that there is a risk of target data, corresponding to an address of a speculatively-issued load operation which is speculatively issued based on the prediction determined by the load prediction circuitry, having changed between the target data being loaded for the speculatively-issued load operation and data being loaded for a given older load operation bypassed by the speculatively-issued load operation; and in response to determining that the tracking information indicates that that there is a risk of the target data having changed between the target data being loaded for the speculatively-issued load operation and data being loaded for the given older load operation, and independent of whether the address of the speculatively-issued load operation corresponds to an address of the given older load operation, request re-issuing of at least the speculatively-issued load operation, even when the prediction for the speculatively-issued load operation is correct.

At least some examples provide a non-transitory computer-readable medium to store computer-readable code for fabrication of an apparatus comprising: processing circuitry to process load operations to load data from a data store; load tracking circuitry to maintain tracking information for one or more load operations issued by the processing circuitry; and load prediction circuitry to determine a prediction for enabling a load operation to be speculatively issued ahead of an older load operation based on the prediction before it is known whether the prediction is correct; in which: the load tracking circuitry is configured to: determine whether the tracking information indicates that there is a risk of target data, corresponding to an address of a speculatively-issued load operation which is speculatively issued based on the prediction determined by the load prediction circuitry, having changed between the target data being loaded for the speculatively-issued load operation and data being loaded for a given older load operation bypassed by the speculatively-issued load operation; and in response to determining that the tracking information indicates that that there is a risk of the target data having changed between the target data being loaded for the speculatively-issued load operation and data being loaded for the given older load operation, and independent of whether the address of the speculatively-issued load operation corresponds to an address of the given older load operation, request re-issuing of at least the speculatively-issued load operation, even when the prediction for the speculatively-issued load operation is correct.

At least some examples provide a method comprising: maintaining tracking information for one or more load operations issued to load data from a data store; determining a prediction for enabling a load operation to be speculatively issued ahead of an older load operation based on the prediction before it is known whether the prediction is correct; determining whether the tracking information indicates that there is a risk of target data, corresponding to an address of a speculatively-issued load operation which is speculatively issued based on the prediction determined by the load prediction circuitry, having changed between the target data being loaded for the speculatively-issued load operation and data being loaded for a given older load operation bypassed by the speculatively-issued load operation; and in response to determining that the tracking information indicates that that there is a risk of the target data having changed between the target data being loaded for the speculatively-issued load operation and data being loaded for the given older load operation, and independent of whether the address of the speculatively-issued load operation corresponds to an address of the given older load operation, request re-issuing of at least the speculatively-issued load operation, even when the prediction for the speculatively-issued load operation is correct.

Further aspects, features and advantages of the present technique will be apparent from the following description of examples, which is to be read in conjunction with the accompanying drawings.

DESCRIPTION OF EXAMPLES

Figure 1:
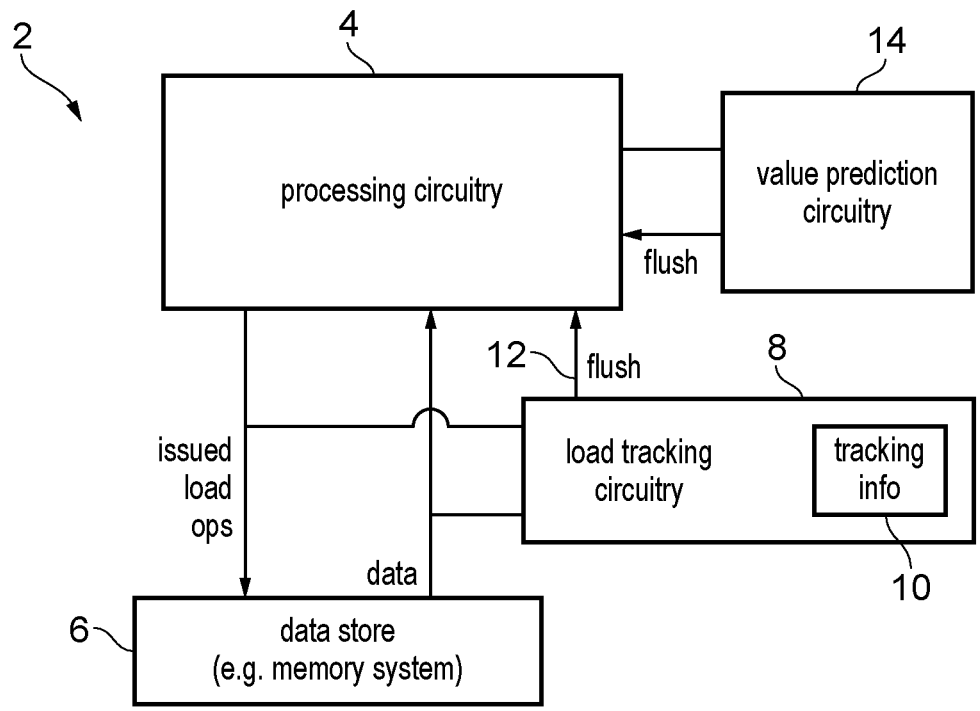
FIG. 1 schematically illustrates an example of a data processing apparatus having processing circuitry, load tracking circuitry and value prediction circuitry.

An apparatus has processing circuitry to issue load operations to load data from a data store (e.g. the data store could be a cache or memory). Load tracking circuitry maintains tracking information for one or more load operations issued by the processing circuitry. Value prediction circuitry is provided, to determine a predicted value of first target data to be loaded from the data store by a value-predicted load operation specifying a first target address. By predicting the value of the first target data, this allows a dependent operation which depends on the first target data to be speculatively issued before an actual value of the first target data is loaded from the data store in response to the value-predicted load operation.

In response to the actual value of the first target data becoming available for the value-predicted load operation, either the load tracking circuitry, or the value prediction circuitry, or a combination of the load tracking circuitry and the value prediction circuitry, may: determine whether the actual value of the first target data matches the predicted value of the first target data determined by the value prediction circuitry for the value-predicted load operation; determine whether the tracking information indicates that, for a given load operation younger than the value-predicted load operation and issued before the actual value of the first target data was available, there is a risk of second target data associated with a second target address of the given load operation having changed after the second target data was loaded by the given load operation; and independent of whether the first target address corresponds to the second target address, request re-processing of at least the given load operation when the actual value of the first target data is determined to match the predicted value of the first target data and the tracking information is determined to indicate that there is a risk of the second target data having changed after the second target data was loaded by the given load operation.

This approach might be seen as counter intuitive, since in the case where the value prediction for the value-predicted load operation is correct, one might assume that as the actual data matched the predicted value, there is no need to request re-processing of a subsequent load operation.

However, the inventor recognised that in a data processing apparatus supporting value prediction, even when the prediction is correct it possible that a memory ordering requirement could be violated in some circumstances. An example of a scenario where a memory ordering violation may occur as a consequence of a correct value prediction is described below with respect to FIG. 9. The ordering violation may arise because, when the load value prediction is correct, although a dependent operation uses the predicted value of the first target data at a first timing, the prediction is confirmed by checking the actual value of the first target data at a second timing, and in between the first target data could have changed. If the dependent operation also depends on other target data from the data store, this could lead to the dependent operation being executed using values of the first target data and other target data which are inconsistent with architectural ordering constraints imposed by code updating the first and other target data, and this ordering violation may not have arisen if value prediction had not been used.

One option for dealing with this problem may simply be to suppress use of value prediction in scenarios where the ordering violation could arise. However, this would harm performance as the ordering violations may be relatively rare and this would eliminate the benefit of value prediction of allowing dependent operations to execute earlier than if they had to wait for the actual value of the first target data.

This problem can be addressed by checking, for a value-predicted load operation for which the actual value of the first target data has been determined to match the predicted value, whether the tracking information maintained by the load tracking circuitry indicates that, for a given load operation younger than the value-predicted load operation and issued before the actual value of the first target data was available, there is a risk of second target data associated with the target address of the given load operation having changed after being loaded by the given load operation, and if this is the case then independent of whether the first target address corresponds to the second target address, at least the given load operation can be re-processed in this scenario. Hence, this technique allows value prediction to be supported in a system where such memory ordering violations could arise.

Note that the given load operation may itself be a value-predicted load for which a value prediction is made, or could be a non-value predicted load which is not subject to value prediction.

In the example above, the re-processing of at least the given load operation occurs based on the determination that the actual value matched the predicted value of the first target data for the value-predicted load, and the determination that the tracking information indicated a risk of the second target data having changed after being loaded by the given load operation younger than the value-predicted load, and the determination of whether to re-process the given load operation in this scenario may be independent of whether the first and second target addresses correspond. However, in some implementations additional criteria may also be applied for deciding whether to re-process the at least the given load operation.

For example, the memory ordering violation which could be caused by the value prediction may arise only if the given load operation younger than the value-predicted load operation actually depends on the value-predicted load operation. If there is no dependency between an operand of the given load operation and an output of the value-predicted load operation then there may be no need to re-execute a subsequent load operation even if there was a risk of target data loaded by that subsequent load operation changing. Hence, in some implementations, an additional criteria for deciding whether to re-process at least the given load operation may be to check for dependencies between the value-predicted load operation and subsequent load operations.

However, in practice tracking such dependencies may be more complex to implement in circuit hardware and some implementations may choose to simplify the circuit implementation by not tracking those dependencies in the tracking information maintained by the load tracking circuitry, so that in that case the determination of whether the given load operation should be reprocessed may be independent of whether the given load operation is actually dependent on the value-predicted load operation. This may recognise that, although the address ordering violation may only occur in the case when the given load operation is dependent, in practice it is not a problem from a functional result point of view to flush and re-process additional operations which were not dependent on the value-predicted load operation, as this will merely affect performance but will not change functional correctness or compliance with any ordering requirements of the architecture. Therefore, it is possible to over-flush in a conservative manner when there is an operation which could potentially encounter the violation, even if the exact circumstances for the violation to occur have not been identified. As the scenarios when a risk of an ordering violation is detected may be relatively rare, occasionally overflushing may not cause a significant performance penalty, and there may be a greater benefit in obtaining power and circuit area savings by a simpler circuit implementation which does not need to perform dependency checks. Hence, it is not necessary to implement dependency checks between older and younger operations for checking whether, on a correct value prediction, a younger operation should be flushed and re-executed to avoid a potential ordering violation caused by the value prediction.

Similarly, whether the address ordering violation actually occurs may in some cases dependent on program execution at another processing element of the data processing system and the exact operations being performed at that processing element may be unknown to the processing circuitry associated with the load tracking circuitry, so again a conservative estimate may be used and it may not be necessary to detect whether the circumstances at the other processing element are such that the violation would actually occur. In a scenario where at least the actual value of the first target data is determined to match the predicted value of the first target data and the tracking information is determined to indicate there is a risk of the second target data having changed after the second target data was loaded, then the given load operation may be reprocessed (without checking whether program code executed elsewhere is such that there would actually have been any chance of the ordering violation occurring).

When a mismatch is detected between the actual value of the first target data and the predicted value of the first target data, at least one of the load tracking circuitry and the value prediction circuitry may request re-processing of at least one operation younger than the value-predicted load operation. Hence, this scenario corresponds to a misprediction of the first target data, and so subsequent operations which depend on the predicted value may have been incorrectly executed and so should be flushed and re-executed. In practice, it may be costly in terms of circuit area and power to check exactly which younger operations depend on the predicted data value and so may be simpler simply to flush and re-execute any younger operation than the value-predicted load operation and re-execute them (with dependent operations then using the actual value of the first target data). When a mismatch is detected between the actual value of the first target data and the predicted value of the first target data, the decision on whether a younger operation should be re-processed may be independent of whether the tracking information indicates there is a risk of target data loaded by a younger load operation having changed after being loaded.

Note that for the case where the value prediction was incorrect, the at least one operation that is flushed and reprocessed may include both load operations and non-load operations, since it is also possible that non-load operations may have been dependent on the value prediction.

In contrast, for the case when the value prediction was correct and the given load operation is re-processed to avoid risk of a memory ordering violation as discussed above, it may not be essential to also flush non-load operations, as the problem with the given load operation is not that it could have used the incorrect input value but that memory ordering requirements may have been violated and these ordering requirements may not apply to non-load operations.

Nevertheless, for simplifying the circuit implementation, in some cases in the case where the predicted and actual values of the first target data match and the tracking information indicates a risk of the second target data having changed, then it may be simpler to request re-processing of a younger operation than the value-predicted load operation regardless of whether it is a load or non-load operation. This can simply circuit implementation because it is not necessary to track dependencies between instructions (which may be needed if only load operations were to be flushed, but non-load operations independent of those loads were not flushed, as other operations dependent on those loads would also need to be flushed). Also, simply flushing and re-executing younger operations regardless of whether they are a load or not can be simpler as it means a common mechanism for requesting flushing and re-execution of instructions can be used, shared with other reasons for flushing/re-executing instructions, such as due to a load value misprediction described above, or due to other types of misprediction for speculative operations, such as a branch misprediction.

Also, in some implementations when (in the case of a correct value prediction when the actual and predicted values of the first target data matched), the point of the program from which younger operations are re-executed may be the given load operation younger than the value-predicted load operation, for which the tracking information indicated that there was a risk of the second target data having changed since being loaded. Hence, it would not be essential to flush and re-execute operations which are younger than the value-predicted load operation, but older than the given load operation.

Hence, in some examples when, for the value-predicted load operation, the actual value matches the predicted value of the first target data and the tracking information indicates the risk of the second target data having changed, at least one of the load tracking circuitry and the value prediction circuitry may request re-processing of any already issued load operation younger than the value-predicted load operation (and as mentioned above, in some cases non-load instructions younger than the value-predicted load operation may also be flushed and re-processed). Again, this can simplify circuit implementation as it means the operations to be flushed following a correct value prediction to avoid risk of ordering violation may be the same as the operations to be flushed following an incorrect value prediction, allowing a common mechanism to be used to request both kinds of flush, and therefore reducing circuit area and power consumption.

In some examples the processing circuitry may support defining some load operations as a load operation having acquire semantics. A load having acquire semantics may impose a memory ordering requirement on younger load operations which specify a different target address to the target address of the load having the acquire semantics. For example, the load with acquire semantics may act as a barrier operation which may require that the younger load operations should not bypass (be executed out of order ahead of) the load with acquire semantics, even if those younger load operations specify a different target address to the address of the load with acquire semantics. This differs from loads not having acquire semantics where, in the absence of any other memory order requirements enforced by earlier instructions, it would be allowable to permit a younger load specifying one address to be processed ahead of the load without acquire semantics. The terms "younger" and "older" refer to the order of the instructions in program order, which may be an order in which the instructions would be executed if instructions were executed sequentially in the logical order in which they are encountered within a given program. Program instructions may be fetched from an instruction cache in program order but, in an out-of-order processor, may be executed out of order so that a younger operation which is independent of older operations may be processed ahead of an older operation if the older operation is stalled awaiting an operand.

Hence, loads which have acquire semantics and therefore impose an ordering requirement on younger load operations may also need a check of whether there is a younger load operation which has been processed ahead of the load with acquire semantics where there is a risk of the target data loaded by the younger load operation having changed after being loaded. The tracking information maintained by the load tracking circuitry may also be used for checking for ordering violations for loads with acquire semantics.

Hence, in one approach the checks performed for the value-predicted load operation may reuse the tracking information provided for tracking other types of ordering violations such as those for loads with acquire semantics. Hence, one way of implementing the check for the value-predicted load can be that, in the confirmation pass for confirming the value prediction for the value-predicted load (the confirmation pass being performed when the actual value of the first target data has become available and is compared against the predicted value to check whether the prediction was correct), the value-predicted load can be treated as a load with acquire semantics, so that the value-predicted load can reuse the same tracking mechanism as the load with acquire semantics (even if the value-predicted load operation is not itself a load with acquire semantics) and therefore trigger an extra check of whether there is a risk of a younger load to a different address having loaded second target data which could have changed after being loaded and could potentially lead to a violation of ordering requirements. This approach can simplify the implementation of the circuit design and reduce overall circuit area and power cost.

On the other hand, for a non-value-predicted load operation which specifies a third target address and does not itself have acquire semantics (so does not impose a memory ordering requirement on younger load operations specifying a different target address to a third target address specified by that non-value-predicted load), when the tracking information indicates that there is a risk of target data loaded by a younger load operation having changed after being loaded, the load tracking circuitry may determine whether to request re-processing of at least the younger load operation depending on whether a target address of the younger load operation corresponds to the third target address of the non-value-predicted load operation. For loads without acquire semantics there may be an architectural ordering requirement to prevent younger loads for a given address bypassing older loads for the same address, but there may be no need to prevent a younger operation bypassing an older load if its target address is different to the target address of the older load, and so hence to avoid unnecessary flushing too many operations, for loads without acquire semantics the check of whether to re-process at least the younger load operation may depend on a comparison of the addresses. Note that in some implementations the tracking information maintained by the load tracking circuitry may track target addresses of loads at a relatively coarse granularity (e.g. at granularity of a cache line, rather than individual byte addresses) and so the comparison of the target addresses could identify the target addresses as corresponding even if the actual target addresses are to different bytes, if both target addresses are in the same cache line or other sized granule of address space as tracked by the tracking information.

Hence, the check performed for the value-predicted load operation on a correct value prediction may differ from the checks performed for non-value-predicted load operations without acquire semantics, in the sense that the check performed for the value-predicted load operation when the prediction is correct may be independent of a comparison between the first target address and second target address, whereas a check for the non-value-predicted load operation without acquire semantics may depend on a comparison between the target address of the younger load operation and the third target address of the non-value-predicted load operation. Hence, there is no need to perform any comparison of addresses when performing the check for the value-predicted load operation in the case of a correct prediction for deciding whether to flush and re-process a younger given load operation, or alternatively the comparison could still be performed but the determination of whether to re-process may not depend on that comparison. In practice, however, power can be saved by not performing the comparison at all.

The load tracking circuitry may maintain the tracking information in various ways. The format of the tracking information could vary significantly from implementation to implementation. Hence, a particular format of the tracking information is not an essential feature of the technique described above, and in practice any information which would allow the load tracking circuitry or value prediction circuitry to evaluate whether there is a risk of the second target data having changed may be used.

However, in one example the load tracking circuitry may maintain, as the tracking information, a tracking structure comprising one or more tracking entries where each tracking entry that was allocated for an issued load operation specifies at least: an age indicator indicative of relative age of the issued load operation; address information indicative of an address of the issued load operation; and a hazard indication indicative of whether a hazard condition has been detected for the issued load operation.

With this format, the hazard indication for a given tracking entry of the tracking structure may be set to indicate that the hazard condition has been detected, in response to detecting a coherency snoop request specifying a snoop address corresponding to the address information specified by the given tracking entry.

The at least one of the load tracking circuitry and the value prediction circuitry could determine that the tracking information indicates there is a risk of the second target data having changed after being loaded by the given load operation when the tracking structure indicates a hazarding tracking entry for which the age indication indicates a younger load operation than the value-predicted load operation and the hazard indication indicates that the hazard condition has been detected for the younger load operation. In scenarios where, when the value prediction was correct for the value-predicted load operation, but there is no younger load indicated in any valid tracking entry of the tracking structure, or where any younger load operations appearing in the tracking structure do not have hazard indications set, then there may be no need to flush and re-execute any younger load operations since in that case there may be no risk of the value prediction causing incorrect results in violation of an ordering requirement.

This approach to using the tracking information can be useful because it recognises that, although at an architectural level certain ordering constraints may be imposed on load operations to maintained synchronisation between operations executed on different processing elements or in different threads, in practice sometimes it may be allowed to execute load operations in an order which differs from the strict order defined in the architecture, as long as there has not been an intervening data access which could have changed the data in the period within which this would have a material effect on the eventual result of processing a sequence of instructions. As long as such data does not change, then even if the operations are executed in an order which is incorrect from an architectural view, as long as the end result is the same then this will not be observed by any subsequent instructions and so can be allowed to proceed without instructions being flushed and re-executed. Hence this approach can improve performance because it means that the processor can have greater flexibility to re-order operations in violation of any architectural ordering constraints where that would help to improve performance by utilising spare processor resource for a younger operation while waiting for an older operation to be unstalled. When handling the value-predicted load operations, a similar approach can be used and so the mere execution of load operations in an order which violates the ordering constraints may not be a problem as long as there is no risk that relevant data has changed and so this can be why the check described above checks an indication of whether the second target has changed.

The techniques discussed above can be applied within an individual processor core. Even in a processor which only has a single processor core, the design of the processor core may be intended for use in multi-processor systems as well and so that single processor core could have the load tracking circuitry and value prediction circuitry discussed above.

However, in practice the ordering violation which occurs following a correct prediction of a value-predicted load may be more likely to occur in systems which have two or more different processing elements (e.g. CPUs, GPUs or other processor cores) which share access to a shared data store, where each of the processing elements has the processing circuitry mentioned earlier and at least one of the processing elements has the load tracking circuitry and the value prediction circuitry mentioned earlier. It is not necessary for every processing element in the system to include the load tracking circuitry and the value prediction circuitry. Some processing elements may not support value prediction. In a system having multiple processing elements, it may be more likely that the value prediction made by one processing element could result in a violation of ordering requirements which are imposed by instructions being processed by another processing element, and so the technique discussed above can be particularly useful in a system with multiple processing elements FIG. 1 schematically illustrates an example of a data processing apparatus 2 which has processing circuitry 4 for performing data processing in response to instructions, a data store (e.g. memory system, which could include one or more caches and memory) 6 for storing instructions to be processed by the processing circuitry 4 and data for access by the processing circuitry 4, and load tracking circuitry 8 which tracks load operations issued by the processing circuitry 4 in response to load instructions and maintains tracking information 10 providing information about those issued load operations. For example, the tracking information 10 can be used to check whether any memory ordering requirements associated with the load operations are satisfied. If a violation of a memory ordering requirement is detected which has the potential to produce incorrect processing results then a flush signal 12 can be sent by the load tracking circuitry 8 to the processing circuitry 4 to request that the processing circuitry 4 is flushed of instructions younger than the point of execution associated with the violation, and the processing circuitry 4 restarts execution of instructions from a point of program flow up to which earlier processing was carried out correctly, where the re-executed instructions will include at least those instructions affected by the violation of the memory ordering requirement (in practice, other instructions not affected by the violation may also be flushed and re-executed to simplify circuit implementation by avoiding needing to implement checks for exactly which instructions may have been affected). While FIG. 1 illustrates parts of the system for handling load operations, it will be appreciated that the processing circuitry 4 also supports other types of processing operations.

The apparatus 2 also has value prediction circuitry 14 for predicting values of data to be loaded by a value-predicted load operation, before the actual data for that load is available from the data store 6. For example the value prediction circuitry 14 may store prediction state information which may be updated to indicate data values observed for loads on previous instances of executing the load, and the stored prediction state may be used to predict the data to be loaded when the same loads are encountered in future. In some examples, a confidence counter may be used for example to track how many times the predicted data value has been seen and once confidence exceeds a given threshold then the prediction may start to be used so that subsequent instructions dependent on the value-predicted load can be executed speculatively based on the predicted value before the actual data is available from the data store 6. The predicted data values could be tracked in the value prediction circuitry in association with program counter addresses of load instructions or in association with the target address of the load. Any known value prediction scheme may be used and so the techniques discussed below are not limited to a particular value prediction technique or a particular format of the prediction state information used to provide data value predictions. Load value prediction helps to break dependency chains and improves performance because if a given load is stalled due to awaiting operands or is a long latency load which takes a long time to service from the data store 6, subsequent dependent instructions can proceed based on the predicted value and if the prediction is correct then this will improve performance. If the prediction turns out to be incorrect then the value prediction circuitry 14 may send a flush signal to the processing circuitry 4 to cancel the effects of the mispredicted data value and cause younger instructions than the value-predicted load operation to be flushed from the processing pipeline and re-executed.

Figure 2:
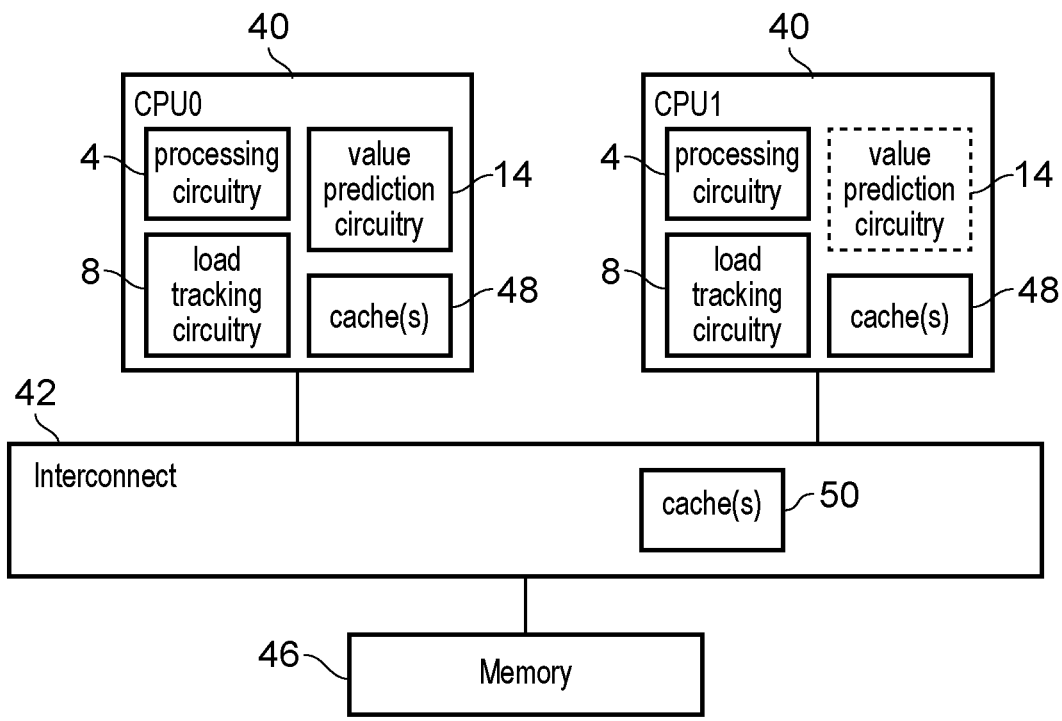
FIG. 2 illustrates an example of a data processing system.

FIG. 2 shows an example of a data processing system which includes a number of processing elements 40, which are capable of executing program instructions defined according to an instruction set architecture. In this example there are two central processing units (CPU) 40, but other examples could have a different number of processing elements and could include processing elements other than CPUs, such as a graphics processing unit (GPU) for example. Each of the processing elements has the processing circuitry 4 and load tracking circuitry 8 as discussed above. At least one of the processing elements has the value prediction circuitry 14. As shown by the dotted lines in CPU 1 in FIG. 2, it is not essential for every processing element to have the value prediction circuitry 14.

The processing elements 40 are coupled via an interconnect 42 which may route communications between the processing elements 40 and memory 46. The interconnect 42 may also manage coherency between data from memory 46 that is cached in various caches 48, 50, including one or more private caches 48 associated with an individual processing element 40 and one or more shared caches 50 shared between the processing elements 40. The caches 48, 50 and memory 46 collectively make up the memory system shown as the data store 6 in the example of FIG. 1.

Figure 3:
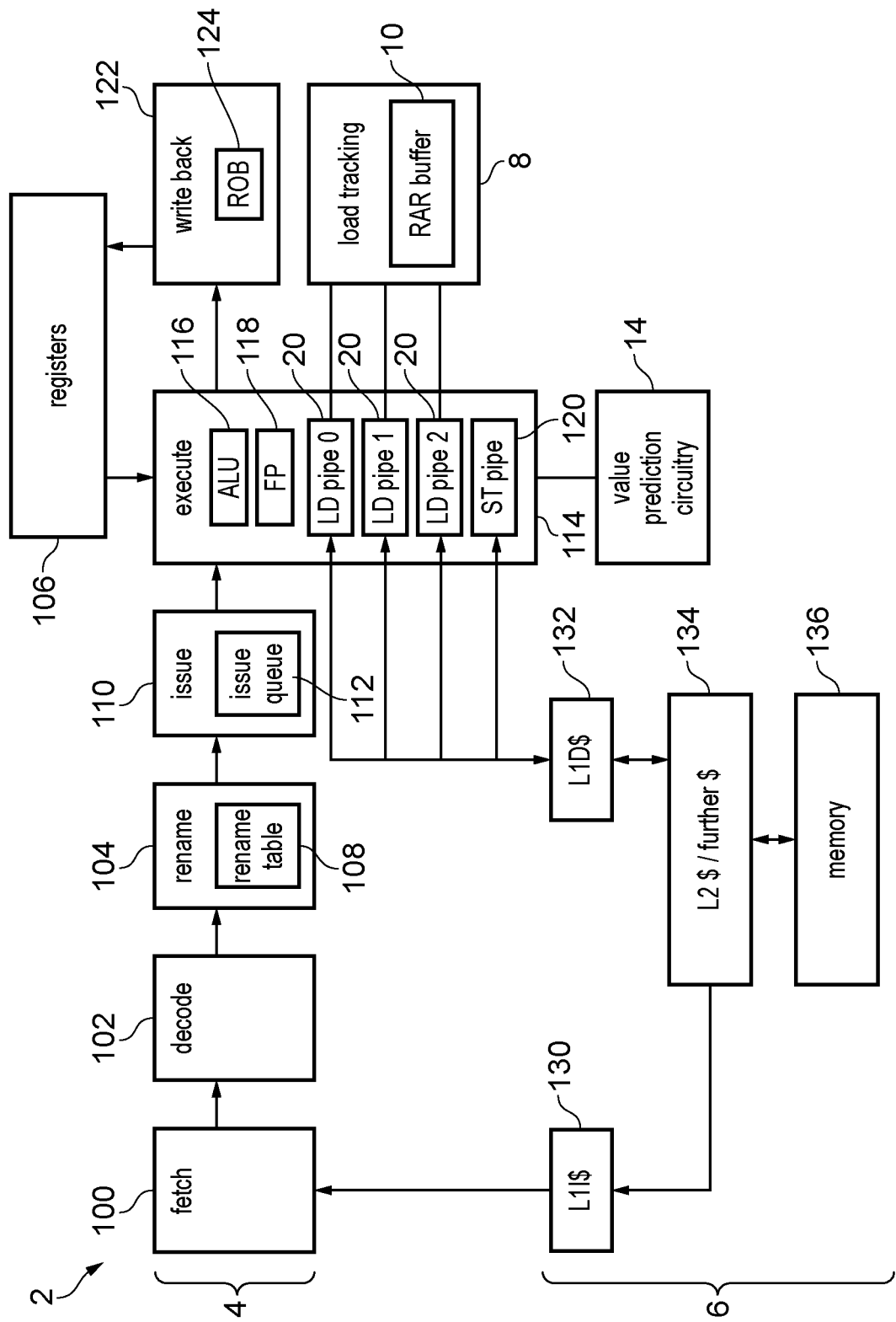
FIG. 3 illustrates features of the apparatus in more detail.

FIG. 3 shows in more detail an example of the data processing system 2 shown in FIG. 1. Again, the system comprises processing circuitry 4, a memory system 6, the load tracking circuitry 8 and the value prediction circuitry 14.

The processing circuitry 4 comprises a processing pipeline with a number of pipeline stages. Instructions progress down the pipeline and at each stage a certain part of the instructions processing is carried out. In this example the pipeline 4 is an out-of-order pipeline which supports instructions being executed in a different order from the program order in which they are stored in the memory system 6.

The pipeline stages in this example include a fetch stage 100 for fetching instructions from the memory system 6, a decode stage 102 for decoding the fetched instructions to identify the operations to be performed and to generate control signals for controlling later pipeline stages to perform the corresponding operations, a register rename stage 104 for mapping architectural register specifiers specified by the instructions to physical registers 106 provided in hardware, using rename mappings tracked using a rename table 108; and an issue stage 110 for retaining issued instructions or micro-operations in an issue queue 112 until their required operands are available and selecting instructions for issuing for execution once the operands are available. As this is an out-of-order pipeline, the issue stage 110 supports the instructions being issued in a different order from the order in which they were fetched by the fetch stage 100, so that if an older instruction (which appears earlier in the program order) is stalled awaiting its operands then a younger instruction (which appears later in the program order) whose operands were already available can be issued ahead of the older instruction.

The pipeline 4 includes an execute stage 114 which includes a number of execution units for executing the processing operations corresponding to the issued instructions or micro-operations. The execute stage 114 includes a number of execution units of different types for executing different classes of instructions, such as an arithmetic/logic unit 116 for executing arithmetic/logical instructions on integer operands, a floating-point execution unit 118 for executing floating-point operations involving operands represented as floating-point numbers, as well as other types of execution unit not shown in FIG. 3 for executing other types of processing operations, such as vector processing, branch operations etc. The execution units may also include a number of load pipelines 20, as well as one or more store pipelines 120 for carrying out store operations to store data from the registers 106 to the memory system 6. It will be appreciated that the particular set of execute units shown in FIG. 3 is just one example and other examples may have different types of execution units or may provide different numbers of execution units of any of the types shown in FIG. 3.

At least for some execute units, when the instructions are executed by a given execute unit, the execute unit generates a result which can be written back to registers 106 by a write back stage 122 of the pipeline. The write back stage may maintain a re-order buffer 124 for tracking commitment of executed instructions based on their execution order and their program order, so that an instruction becomes committed once it has executed and any earlier instructions in the program order have also committed.

It will be appreciated that the processing system 2 could also have many other elements not shown in FIG. 3, such as a branch predictor or memory management unit. In this example the memory system 6 includes a level 1 instruction cache 130, level 1 data cache 132, a shared level 2/further cache 134 and main memory 136, but it will be appreciated that other memory hierarchies could be used, for example with further levels of cache or a different sharing relationship between the instruction caches and the data caches.

Also, in a multi-processor-core system such as the one shown in FIG. 2, other processing elements 40 with a similar configuration to the one shown in FIG. 3 could share access to the same memory 46, 136, and coherency mechanisms may be used to maintain coherency between the respective caches in the different processing elements, for example using a coherent interconnect providing a snooping mechanism, which generates snoop requests sent to caches 130, 132, 134 associated with one processing element when another processing element issues a request for data. Any known coherency control mechanism may be used for this.

Figure 4:
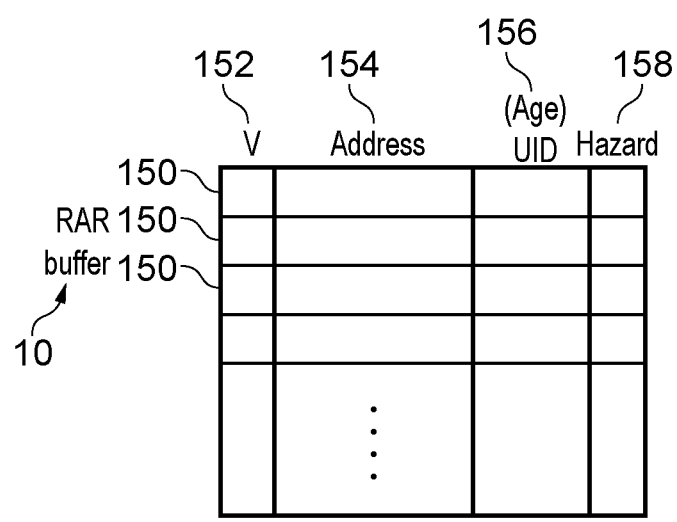
FIG. 4 illustrates an example of a read after read (RAR) buffer.

As shown in FIG. 3, the load tracking circuitry 8 may maintain, as a specific example of the tracking information, a read after read (RAR) buffer 10. FIG. 4 illustrates an example of the RAR buffer 10 in more detail. The RAR buffer 10 may comprise a number of tracking entries 150 which each specify: a valid indication 152 indicating whether the corresponding entry 150 is valid, an address 154 of a corresponding load operation processed by the load pipelines 20, an instruction identifier 156 (UID or unique instruction identifier) which identifies the instruction corresponding to that load operation, and a hazard indication 158 indicating whether a hazard has been detected for the corresponding load operation. Memory ordering requirements of different types may be enforced on load operations, for example enforcing that an earlier load cannot bypass a later load to the same address, or a requirement that if a data synchronisation barrier (DSB) instruction is executed then a younger instruction than the barrier cannot be observed to be executed before an instruction which is older than the barrier. The UID 156 may be treated as an indication of the relative age of the instructions corresponding to process load operations. Allocation of the UID to particular instructions could be done by one of the stages of the pipeline 4, such as the fetch stage 100, decode stage 102 or rename stage 104, within the portion of the pipeline where instructions are still being processed in program order for example. For example each time a new instruction is fetched the fetch stage 100 could allocate the next UID value 156 to that instruction. The UIDs may be an indication of relative age of the instructions in program order, e.g. being allocated in age order.

The RAR buffer 10 may be searchable either by address 154 or by UID 156, so that when a given load operation is processed, the load tracking circuitry 8 can detect whether there is a valid entry in the RAR buffer for the same address 154 and/or whether the RAR buffer 10 already includes a valid entry for the same or younger UID 156. The address field 154 could specify either: a full physical address (PA), a portion of the full PA which identifies a cache line, or a hash value derived from the full PA or portion of the PA using a hash function which may map the PA (or cache line identifying portion of the PA) to a hash value having fewer bits than the PA, so that multiple PAs may alias onto the same hash value, leading to a potential for false positive detections of address hazarding. Hence, for the purpose of comparing an address stored in the RAR buffer 10 and an address of a load operation or snoop, the addresses may be considered to be "corresponding" in any of the following cases: the addresses are the same; cache line portions of the addresses are the same; or the addresses are different but are aliasing addresses which are both mapped to the same hash value by the hash function.

Figure 5:
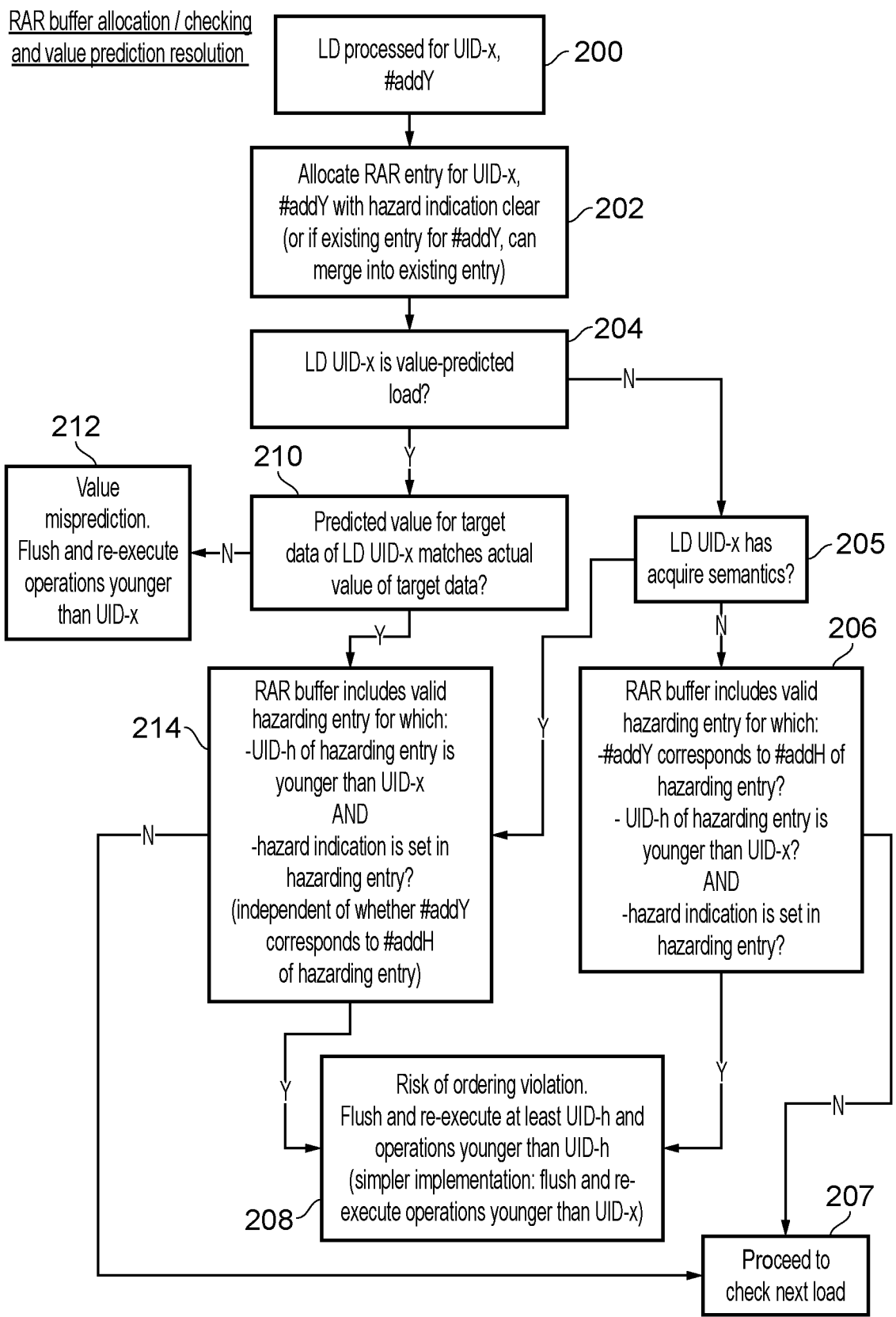
FIG. 5 is a flow diagram illustrating maintenance of load tracking information in the RAR buffer and checking for whether an ordering violation may have occurred.

FIG. 5 is a flow diagram showing use of the RAR buffer for tracking load operations and checking for hazards that could cause memory ordering violations, as well as checking whether value predictions are correct.

At step 200 the load tracking circuitry 8 detects that a load operation is processed with specifies a given UID (UID-x) and a certain target address #addY.

In response, at step 202 the load tracking circuitry allocates a new RAR buffer entry, with the valid bit 152 set, the address field 154 set based on target address #addY, the age indication 156 set based on UID-x, and the hazard indication 158 initially clear. Alternatively, if there is an existing entry for address #addY it is possible to merge the new request in to the existing entry, for example by updating the age field 156 to specify the UID of the younger UID of the UID currently in the age field 156 of the merged entry and the UID-x of the load currently being processed. If the load operation is a value-predicted load, the operations shown in FIG. 5 may be performed at the time of the confirmation pass of the value-predicted load, when the actual value of the target data has become available and is ready for comparison against the predicted value performed by a value prediction. Hence, the allocation of the RAR entry may take place at the time of performing the confirmation pass, rather than the time when the predicted value of the target data is determined for the value-predicted load.

At step 204 the load tracking circuitry 8 or value prediction circuitry 12 (or a combination of the two) checks whether the load operation UID-x is a value-predicted load for which the value prediction circuitry 14 predicted a value of the target data to be loaded by that instruction. If the load is not a value-predicted load then at step 205 the load tracking circuitry 8 determines whether the load has acquire semantics. A load with acquire semantics may be a load which imposes a memory ordering requirement on younger load operations which specify a different target address to the target address of the load with acquire semantics. In some cases there may be dedicated types of load operations, e.g. based on execution of a load-acquire instruction which has a different encoding to other types of load instruction. For example, the load-acquire instruction could be identified based on the opcode of the load instruction, to cause the load to be treated as having acquire semantics.

If the load operation does not have acquire semantics then at step 206 the load tracking circuitry 8 checks for hazarding entries which may signal a possible memory ordering violation. This is because an architectural order requirement may be that when performing out of order processing it may not be allowed, from an architectural view, for a younger load to bypass an older load for the same address, but in practice, violating this order and requirement may not be a problem unless a hazard has been detected indicating that the data for that address may have been updated elsewhere in the system (e.g. this can be detected based on snoop requests sent by the interconnect 42 according to a coherency protocol). If a hazard is detected, then the ordering violation may cause incorrect functional results. Hence, as long as there has been no hazard detected then the loads may be allowed to proceed even if there is a technical violation of the ordering requirement, whereas if there is an incorrect order of processing loads in violation of the ordering requirement and the hazard has been detected and this may be a problem and a flush may be triggered.

Hence, at step 206 the load tracking circuitry 8 detects whether the RAR buffer 10 includes a valid hazarding entry for which all of the following requirements are satisfied:

The address #addY corresponds to an address #addH in the address field 154 of the hazarding entry (note that the addresses #addY and #addH need not correspond to exactly the same byte of data in memory, but may be considered to correspond if any part of the block of data required for the load to address #addY overlaps with any part of the block of data indicated by address #addH, or if the addresses #addY, #addH share the same hash value in implementations which use a hash function to compress the address stored in the RAR buffer);

The UID field 156 of the hazarding entry specifies an instruction identifier UID-h which indicates a younger instruction than the instruction identified by UID-x as specified for the current load encountered at step 200; and The hazard field 158 for the hazarding entry has been set to indicate that a hazard was detected.

If a hazarding entry is identified in the RAR buffer 10, for which all of these three requirements are satisfied, then at step 208 a risk of a memory ordering violation is detected as this may be an indication that instructions or load operations were processed in an order which is inconsistent with an order imposed by an architectural memory ordering requirement and the presence of the hazard indication indicates that this has a potential to cause incorrect processing results. Hence, at step 216 the load tracking circuitry issues the flush signal 12 to the processing circuitry 4 to request flushing of instructions younger than UID-x from the pipeline and re-execution of instructions. The flushed instructions may include at least the instruction identified by UID-h in the age field 156 of the hazarding entry 150 and younger instructions than the instruction with UID-h. Note that in this case the instruction identified by the UID-x of the current load does not need to be flushed and re-executed.

In practice, while to mitigate against the potential risk of ordering violation, it is sufficient that the pipeline 4 is flushed of at least the instructions starting from instruction UID-h for which the hazard is detected and it is not necessary to flash and re-execute instructions which appear in program order between the load UID-x and the hazarding load UID-h, and in implementations which do not support merging of entries for the same address as explained above for step 202, this can be feasible, it may nevertheless be simpler to implement a system where whenever a flush is needed then the flush is triggered from the load UID-x which is currently being compared against the contents of the RAR buffer, and so in this case any operations younger than UID-x may be flushed, even if they are older than the operation with UID-h which encountered the hazard. In implementations which do support merging of RAR buffer entries for the same address, the indication of UID-h cannot be relied upon to determine the point to flush from because there may have been a load older than UID-h but younger than UID-x that bypassed the load with UID-x. Hence, for implementations which do support merging of RAR buffer entries for the same address, at step 208 any operations younger than UID-x may be flushed, even if they are older than the operation with UID-h which encountered the hazard.

Also, while it may be sufficient to deal with the potential ordering violation to only flush and re-execute load operations, in practice it may be simpler to flush and re-execute all types of operations in case there are dependencies on flushed loads (this avoids incurring extra circuit overhead in tracking the dependencies).

On the other hand, if at step 206 no valid hazarding entry is identified in the RAR buffer (either there are no younger operations indicated by valid RAR entries, or any such RAR entries for younger operations do not have the hazard indication 158 set to indicate that a hazard occurred) then at step 207 hazard checking for the load UID-x regarding the load tracking information 10 is complete and the load tracking circuitry 8 can proceed to perform checks for the next load, starting again at step 200 for that load.

If at step 205 it was determined that the load UID-x had acquire semantics, and so did impose a memory ordering requirement on younger loads even if those younger loads have a different address specified as the target address, then at step 214, the load tracking circuitry 8 again searches for a valid hazarding entry in the RAR buffer for which the UID field 156 specifies a valid UID-h which is younger than UID-x and the hazard indication 158 is set to indicate that a hazard has occurred, but in the case of a load with acquire semantics it is not necessary to compare the target address #addY of the load UID-x against the address #addH of the hazarding entry as the potential ordering violation may be identified independent of whether #addY corresponds to #addH of the hazarding entry. This is because a load has acquire semantics imposes an ordering requirement on younger loads even if they specify a different address.

If at step 214 a valid hazarding entry is identified then again at step 208 a risk of ordering violation is determined and the load tracking circuitry 8 issues the flush signal 12 to indicate that at least the hazarding load UID-h and any operations younger than that load should be flushed (although again it is also possible to flush and re-execute operations younger than UID-x but older than UID-h). Hence, step 214 is similar to step 206 except that detecting the ordering violation does not depend on an address comparison. If at step 214 no valid hazarding entry is detected then at step 207 the load tracking circuitry 8 proceeds to check the next load.

If at step 204 load UID-x was determined to be a value-predicted load then at step 210 the valid prediction circuitry 14 determines whether the predicted value for the target data of load UID-x matches the actual value of the target data obtained from the data store. If not, then a value misprediction is identified and so at step 212 operations (including both load and non-load operations) which are younger than the mispredicted load UID-x are flushed and re-executed. This prevents dependent operations which may have proceeded based on the incorrect predicted value from generating incorrect results as they are executed again using the actual value of the target data of the value-predicted load UID-x.

On the other hand, if at step 210 it is determined that the predicted value for the target data matches the actual value, so that the value prediction was correct, then at step 214 the value-predicted load is treated in the same way as a load with acquire semantics (even if the value-predicted load is not itself a load with acquire semantics). Hence, again the load tracking circuitry 8 and/or the value prediction circuitry 14 may determine, in the case of a correct value prediction, whether the RAR buffer includes a valid hazarding entry, which again is detected based on the UID-h of the hazarding entry indicating a younger instruction than UID-x of the value-predicted load and the hazard indication 158 being set, but is independent of any comparison of the target addresses #addY, #addH for the respective loads, so that even if the loads UID-h and UID-x are for different addresses then the risk of ordering violation may still be detected and flushing and re-execution of younger operations may be triggered at step 208 in the same way as discussed earlier. This helps to deal with a possible ordering violation which can be caused by the value prediction as discussed further with respect to FIG. 9 below. If the value-predicted load was correctly predicted (Y at step 210), but there is no valid hazarding entry found in the RAR buffer (N at step 214) then again at step 207 there is no need to carry out any flush and the processing can proceed to check the next load.

Figure 6:
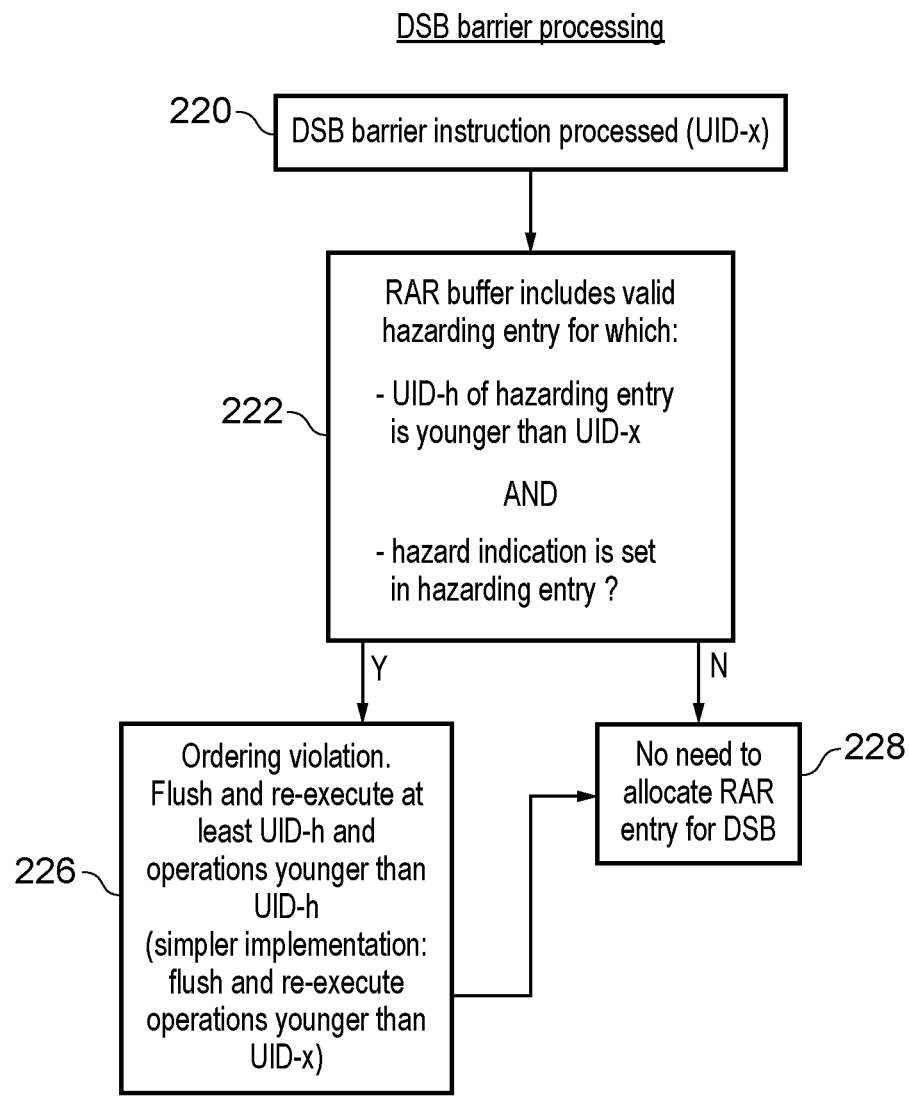
FIG. 6 is a flow diagram showing processing of a barrier instruction.

FIG. 6 shows an example of processing a data synchronisation barrier (DSB) instruction. At step 220 the DSB barrier instruction is processed. The DSB barrier instruction is associated with a given instruction identifier, UID-x. At step 222 the load tracking circuitry 8 detects whether the RAR buffer 10 includes a valid hazarding entry for which the UID field 156 indicates a younger UID-h than UID-x associated with the barrier instruction, and for which the hazard indication field 158 is set to indicate that the hazard has been detected. Note that (in comparison to step 206 of FIG. 5) for step 222 there is no requirement for the address field 154 of the hazarding entry to correspond with any address associated with the barrier instruction 220. Hence, the check for a DSB instruction may be similar to the check at step 214 for a correctly value-predicted load or a load with acquire semantics. If the UID-h of the hazarding entry is younger than the UID of the barrier and the hazard indication 158 is set then this is an indication that there is a potential that the younger instruction identified by UID-h could have been executed ahead of a load which preceded the barrier, and the setting of the hazard indication indicates that this has the potential to create incorrect results which are inconsistent with the results which would be achieved if the instructions had been processed in the order enforced by the barrier. Hence, at this point at step 226 a memory ordering violation is detected and operations younger than UID-h (and optionally instructions younger than UID-x and older than UID-h as well) are flushed and executed (this may be referred to as a 'nuke-next' operation), the same as at step 208 of FIG. 5. Again, in implementations which support merging of entries for the same address, the instructions younger than UID-x (including those older than UID-h) are flushed and executed for the same reason described earlier for step 208. On the other hand, if at step 222 there was no hazarding entry detected (so for each entry of the RAR buffer 10, the entry is either invalid, specifies an older UID than UID-x or has the hazard indication 158 clear) then no memory ordering violation is detected and so at step 228 there is no need to trigger the nuke-next operation. Regardless of whether the memory ordering violation was detected or not, for a DSB barrier instruction there is no need to allocate an RAR buffer entry 150 for the DSB barrier instruction (step 228 is reached after step 226 as well as on the 'N' branch of step 222). Note that the hazard checking with the RAR buffer 10 which is performed for the DSB barrier is similar to the hazard checking done in FIG. 5 for a load with acquire semantics, except that for the DSB barrier there is no need to also allocate an RAR entry as in step 202 of FIG. 5 because this is not itself a load operation.

Figure 7:
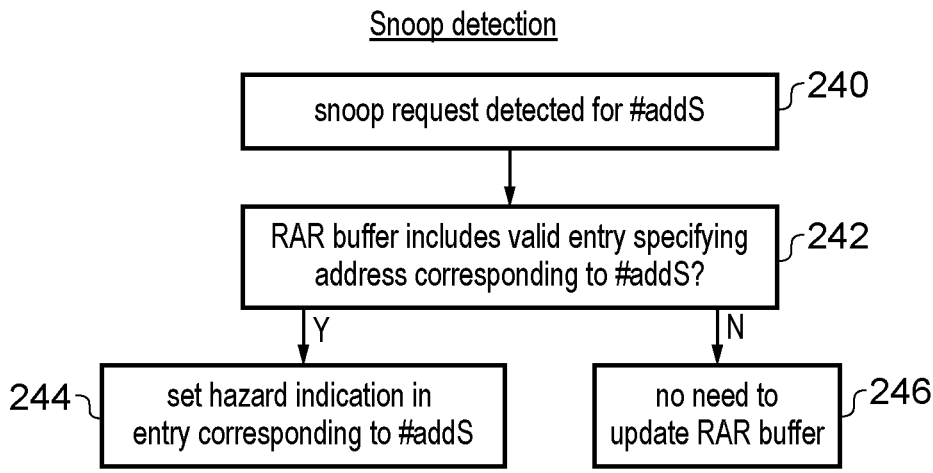
FIG. 7 is a flow diagram showing updating of the RAR buffer in response to detection of a snoop request.

FIG. 7 is a flow diagram showing use of the RAR buffer 10 when snoop requests are detected for a given snoop address #addS. This snoop may be issued by interconnect 42 to one or more of the caches 130, 132, 134, for example based on a coherency scheme for maintaining coherency between these caches and caches in other processing elements of the same processing system. At step 240 the snoop request is detected. In response to the snoop request, at step 242 the load tracking circuitry 8 detects whether the RAR buffer includes a valid entry 150 which specifies an address corresponding to the snooped address #addS. If so, then at step 244 the hazard indication field 158 in the valid entry corresponding to #addS is set. If there is no valid entry in the RAR buffer 10 corresponding to #addS then at step 246 there is no need to update the RAR buffer 10 in response to the snoop request 240. Note that in some cases the steps performed in FIG. 7 may be performed only in response to certain types of snoop request and there may be other types of snoop request which do not require updating of the RAR buffer at all.

Figure 8:
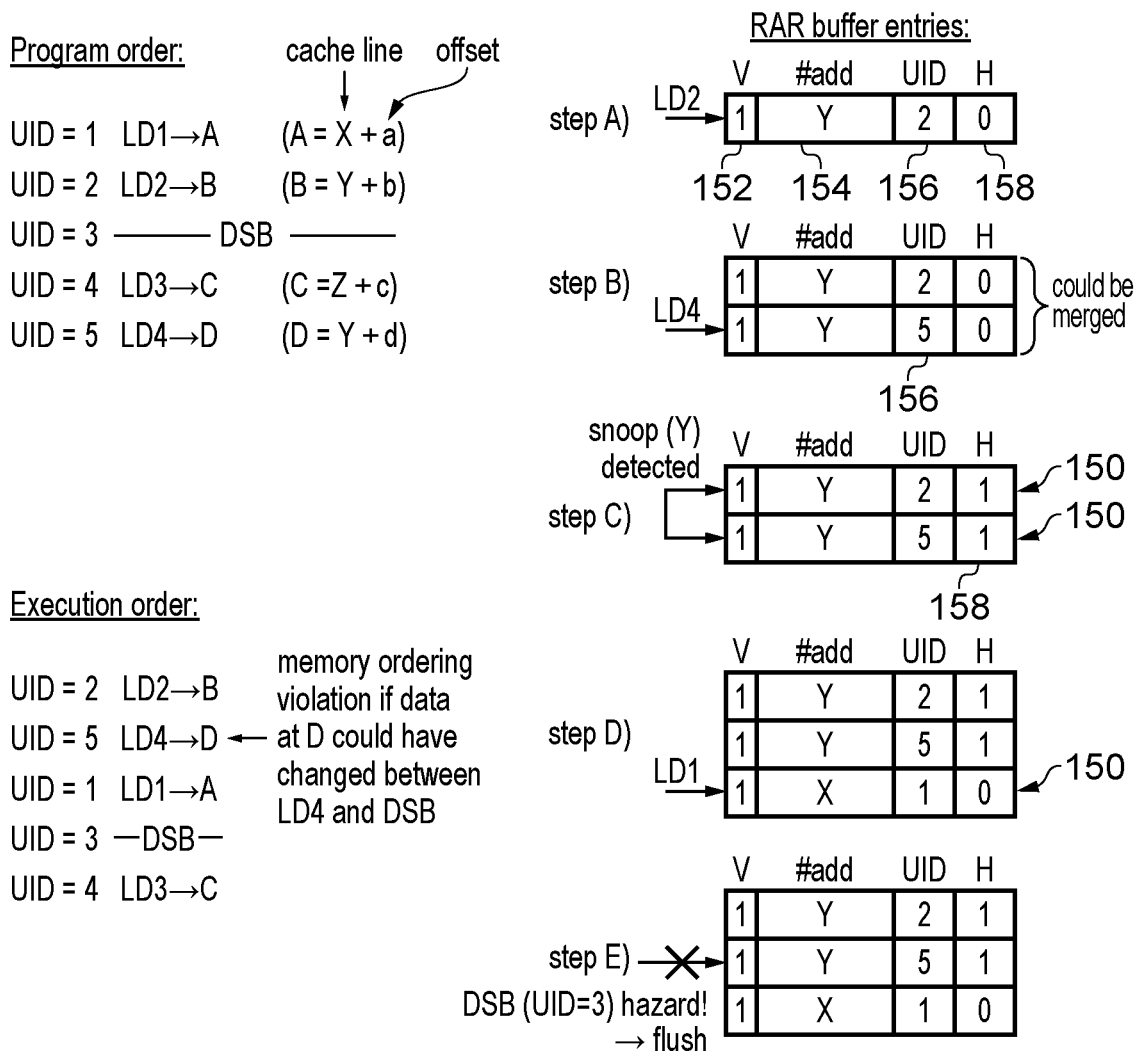
FIG. 8 shows a worked example illustrating use of the RAR buffer for detecting memory ordering violations.

FIG. 8 shows a worked example illustrating detection of a memory ordering violation using the RAR buffer 10 (in this example, the memory ordering requirement is caused by a barrier instructions). The top left part of FIG. 8 shows several load operations to be processed, arranged in program order, relative to a barrier instruction DSB. Each instruction is assigned a UID, and the UIDs are assigned in an order corresponding to the program order. Although FIG. 8 shows consecutive UIDs 1-5 for the respective instructions, it will be appreciated that in practice these loads may be separated by other types of non-load or barrier instruction and so it is possible that the UIDs for the respective instructions may not be consecutive.

Accesses to memory may be controlled within the memory system 6 in units of data having a certain size referred to as a cache line, so that even if a given load operation only requires a certain part of the data from that cache line, the memory system may nevertheless return the entire cache line. This can help with improving performance as it is quite common that if a load requests one part of the cache line, a subsequent load may request another part of the same cache line. Typically, caching within the caches 130, 132, 134 and/or coherency management based on the snoop requests may be tracked using addresses at the granularity of an individual cache line. Hence, for consistency with this tracking, the addresses 154 in the RAR buffer may also indicate an address of an entire cache line and may not distinguish between which particular byte portion is accessed by an individual load operation within a cache line. As shown in the top left part of FIG. 8 the addresses A-D of the respective loads could be formed using a first portion X, Y or Z which identifies the cache line to be accessed and a second portion a-d which indicates an offset within the cache line. In this example the addresses B and D are such that they are accessing different offsets within the same cache line and so they share the same cache line portion Y but have different offsets b, d. Hence, as the address tracking 154 in the RAR buffer 10 is at the granularity of cache lines these loads would be seen as accessing the same address even though they are actually accessing different offsets within the same cache line. The use of '+' to indicate the combination of the cache line portion and offset portion does not imply an addition would be needed to combine the cache line and offset—in practice the cache line portion may be a most significant bit portion of the address and the offset portion a least significant bit portion and so the resulting address can be obtained by concatenating the two portions. Also, while not shown in FIG. 8, in some implementations of the address field 154 of a RAR buffer entry may be set based on a hash of the cache line portion, which could differ in value to the cache line portion of the address itself.

As shown in the bottom left part of FIG. 8, due to out of order processing by the processing pipeline 4, the execution order in which the load operations are actually carried out may be different from the program order. For example, if the load LD1 is stalled because its address operands are not ready yet, then other load operations LD2, LD4 may be performed ahead of it.

The barrier instruction DSB signals that there is an architectural requirement for the results of processing to be consistent with the results that would be achieved if none of the loads LD3, LD4 which follow the barrier instruction DSB are executed ahead of any of the older loads LD1, LD2 which precede the barrier instruction in the program order. Hence, while the ordering requirement imposed by the barrier instruction may be respected if LD2 is reordered ahead of LD1, because these are all instructions on the same side of the barrier, or if LD4 is reordered ahead of LD3, it is a disagreement with the ordering requirement for LD3 or LD4 to be performed ahead of either LD1 or LD2. Hence, in the example of the execution order shown at the bottom left of FIG. 8 there is a memory ordering disagreement because load LD4 has been executed before load LD1.

This disagreement between the execution order and the memory ordering requirements imposed by the barrier instruction can be tolerated, provided that there is no possibility that data associated with address D of load LD4 changed between the actual execution of load operation LD4 and the execution of the barrier instruction DSB. However, if the data associated with address D could have changed then it is possible that the disagreement with the memory ordering requirement could have caused the wrong results and in the case it would be needed to re-execute load operation LD4.

The right hand part of FIG. 8 illustrates updating of the RAR buffer 10 in response to the operations shown in execution order at the bottom left of FIG. 8. At step A, load operation LD2 is executed to address B and so the cache line portion Y of the address (or a hash of this portion) is allocated into a new RAR buffer entry 150 specifying the UID=2 for load operation LD2 and the hazard flag 158 is clear when that entry is initially allocated. In FIG. 8, for conciseness only valid entries 150 of the RAR buffer relating to the particular instructions shown in the examples on the left-hand side of FIG. 8 are shown and any other RAR buffer entries are omitted.

At step B, the load operation LD4 is executed to address D within cache line Y and so a RAR buffer entry which is valid and corresponds to the address Y and UID 5 is allocated into the RAR buffer. As mentioned above it is possible for entries to be merged if desired as the entries for LD2 and LD4 both relate to the same cache line address Y. If the entries are merged then the UID field 156 of the merged entry would take the UID of the younger of the loads associated with the merged entries (e.g. UID 5 in this example). However, in the particular example shown in FIG. 8 these entries are not merged.

At step C in the example of FIG. 8 a snoop request specifying the cache line address Y is detected and so the hazard fields 158 of any entries corresponding to address Y are set. This is not in itself a problem because if no disagreement with the memory ordering requirement occurs, then the presence of the hazard would not have affected the correctness of the results. Hence, processing continues despite the hazard having been detected and marked within the RAR buffer entries associated with address Y.

At step D the load operation LD1 is executed and as this does not correspond to the UID or the address of any existing entry, a new RAR buffer entry 150 is allocated for address X and UID1 associated with load LD1, and the hazard flag is set to 0 in that entry. Although LD1 has an older UID than the existing entries for LD2 and LD4 with the hazard flag set, this is still not in itself a problem because LD1 relates to a different address to the address Y of existing entries (and is not a load with acquire semantics in this example) and so this does not violate the requirement to execute loads to the same address in program order, and if there is no subsequent barrier instruction then there is no restriction on reordering load LD2 or LD4 ahead of load LD1.

However, at step E of FIG. 8 the barrier instruction DSB is encountered and the DSB introduction has a UID of 3. On looking up the RAR buffer, the load tracking circuitry 8 detects that there is at least one existing entry which has a younger UID (5) than the UID (3) of the DSB instruction and which has the hazard flag set, and therefore the nuke-next operation is triggered which will cause any instructions with younger UIDs than the DSB instruction to be flushed from the pipeline, and will cause program execution to restart from the UID 4 of the next instruction after the DSB instruction, which will therefore cause the load operation LD4 (which was executed early in violation with the ordering requirement) to be re-executed so that it will then see the updated results of any updates to address Y which caused the issuing of the snoop request detected at step C. Once load LD4 has been re-executed the processing will then have generated results consistent with those required by the ordering requirement.

At steps A, B and D of FIG. 8, when a new entry of the RAR buffer is allocated then any invalid entry may be selected for use of the new entry. Entries may be invalidated from the RAR buffer when the write back stage 122 confirms that the corresponding UID has been committed. If a given load is to be processed and there are no invalid RAR buffer entries 150 spare then processing of load operations may be stalled until a spare entry can be recovered.

Barriers are not the only memory ordering requirement—it will be appreciated that the RAR used as shown in FIG. 5 also enables detection of memory ordering violations involving loads to the same address executed out of program order.

Figure 9:
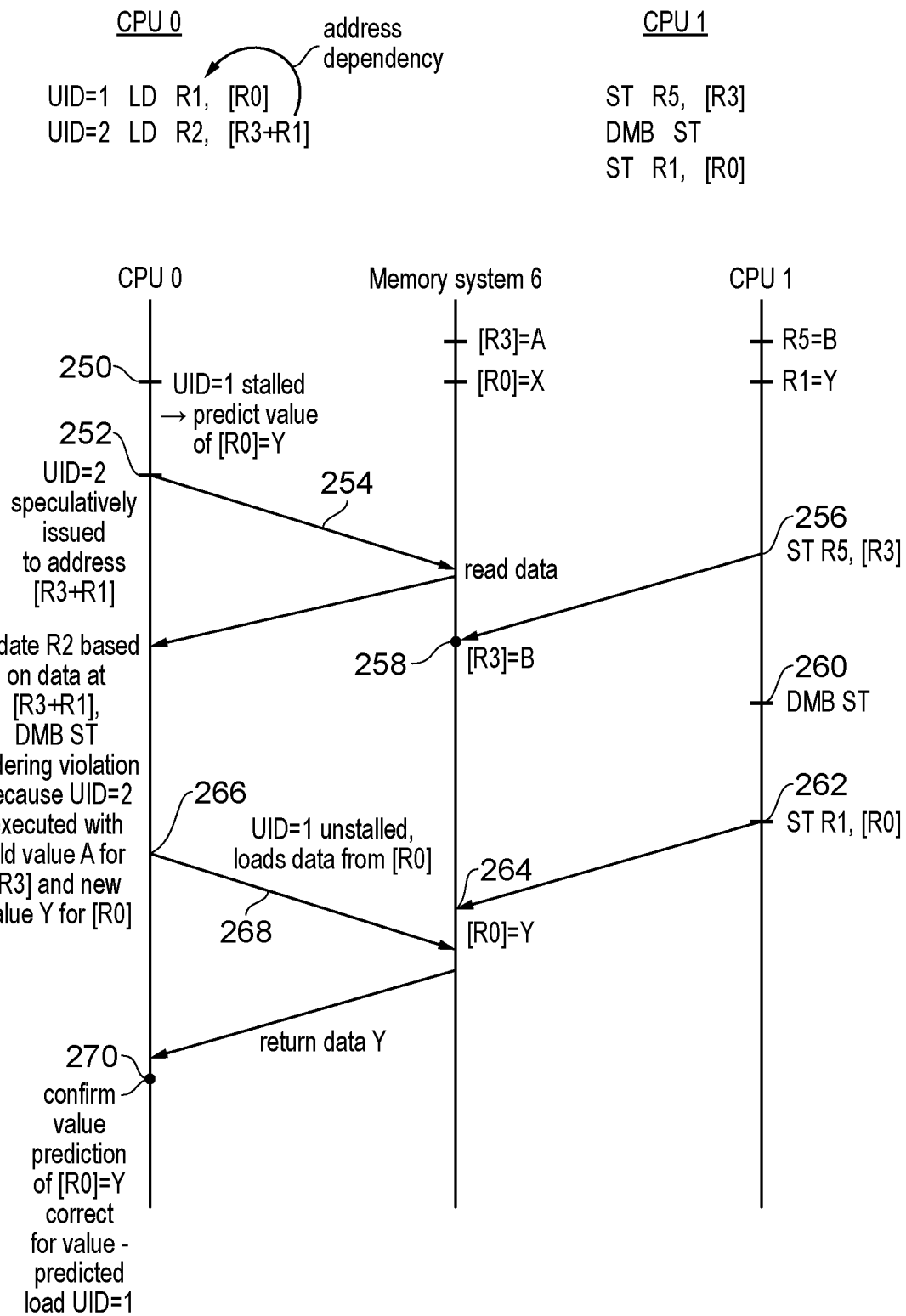
FIG. 9 shows an example of a potential ordering violation that may be caused by a value prediction.

FIG. 9 illustrates a worked example showing how an ordering violation may arise due to a value prediction made for a value-predicted load. FIG. 9 shows a code example where the two CPUs 0 and 1 in the system shown in FIG. 2 are each executing some code which interacts via some shared variables. In this example the shared variables are the data stored at addresses that are identified as [P0] and [R3]. For ease of understanding, it is assumed that the code on both CPU0 and CPU1 are using the same registers R0 and R3 to store the address information for computing the addresses of [P0] and [R3], but it will be appreciated that this would not be essential and even if CPU1 was using different registers to store the address information for these variables compared to CPU0 there could still be a similar issue if they access the same address.

Hence, CPU0 executes a first load operation (identified using UID=1) which is a value-predicted load in the example described below and acts to load register R1 with the data value stored at an address [P0] computed based on a value in register R0. The CPU0 also executes a second load operation (UID=2) that loads register R2 with a data value obtained from an address [R3+R1] which depends both on the value loaded into R1 from address [P0] by the first load and on the value of the other shared variable at address [R3]. In this example, it is assumed that the value in R1 is a one-bit flag (having a value 0 or 1) so that the address [R3+R1] will be in the same cache line as the address [R3], regardless of the value of R1. For example, [R1] may be a flag variable which controls which particular byte of data should be accessed within the cache line indicated by the address [R3]. This means that, as the addresses [R3] and [R3+R1] are in the same cache line, these addresses cannot be distinguished by snoop requests (which track addresses at granularity of cache line) and so an update of the data at address [R3] triggered by CPU1 would cause a hazard indication to be set for the RAR buffer entry associated with the load UID=2 to address [R3+R1].

Hence, the second load depends on both of the shared variables [P0] and [R3] which the code on CPU1 also interacts with. Also the second load on CPU0 has an address dependency on the first load due to using register R1 for calculating the address of the second load.

The code on CPU1 includes two store operations for updating the values of the shared variables at addresses [R3] and [P0]. The code on CPU1 also includes a store memory barrier DMB ST appearing between the first store updating the data at address [R3] and the second store updating the data at address [P0], which imposes an ordering requirement that the view of data in memory seen by other observers (such as the code running on CPU0) must be consistent with the outcome which would arise if the first store to update the data at address [R3] on CPU1 was executed before the second store to update the data at address [P0]. Hence, it would not be allowed for another observer to see the updated value for the data at address [P0] while seeing the old value for the data at address [R3]. Of course, the code executing on CPU0 (and the hardware logic of CPU0 itself) does not have any visibility of what operations are happening at CPU1, but the system can be designed so that the effects of the code executing on CPU0 do not cause any inadvertent violation of any ordering constraints which may have been imposed by the code at CPU1.

FIG. 9 shows a ladder diagram illustrating a flow of operations on CPU0 and CPU1 as they interact with the memory system 6. Here, the memory system 6 could include private caches 48 of the respective CPUs or could include a shared cache 50 or main memory 46—if data is accessed in private caches 48 then the interconnect 42 may act to maintain coherency between the caches on CPU 0 and CPU1.

Initially, before either CPU starts executing its code, the values of the shared variables are that the data at address [R3] is equal to A and the data at address [P0] is equal to X. It is assumed that the values in registers R5 and R1 of CPU1 are set to values B and Y respectively so that when the respective stores execute these will change the values at addresses [R3] and [P0].

At step 250, CPU0 reaches the first load UID=1 and finds that its operation is stalled, for example because it is waiting for older instructions to calculate operands needed to calculate the address [P0]. Therefore, the actual load operation for UID=1 cannot be issued yet and normally one would expect that as UID=2 is dependent on UID=1 then this would also stall UID=2. However, as CPU0 has the value prediction circuitry 14, CPU0 is able to make a prediction of what the data value from address [P0] will be and on this occasion predicts that the data value at address [P0] is Y. For example this may be based on prediction state information which may have observed on a number of previous occasions that loads to address [P0] tended to return the data value Y. Alternatively, rather than basing value predictions on the target address of the location in memory from which data is to be loaded, the predictions could be based on a program counter address associated with the load UID=1, if it is identified that a load instruction having a particular program counter address tends to return a certain data value. Regardless of how the value prediction is obtained, once a predicted value for the data value being loaded to register R1 by load UID=1 is available, then this breaks the dependency between load UID=2 and load UID=1 and so at step 252 the second load can be speculatively issued based on the value prediction. Hence, in this case the load request 254 for the second load with UID=2 is issued to an address [R3+R1]. The data at address [R3+R1] is read from the memory system 6 and written to register R2. Hence, by supporting the value prediction, this allows a younger load to execute earlier than would have been possible without value prediction.

In the meantime, the code at CPU1 is executing and at step 256 the first store instruction executes and stores the value in register R5 to the memory system location associated with address [R3], and so at step 258 the data corresponding to address [R3] is updated to the value B. CPU1 then executes the store barrier at step 260 which ensures that the younger store operation cannot bypass the older store operation. At step 262 the younger store operation is executed by CPU1 and this causes the data at memory system location corresponding to address [P0] to be updated to the value in register R1 and hence set to data value Y, at step 264. Note that the order of the operations performed by CPU1 was correct and respects the barrier indicated by DMB at step 260.

Meanwhile, at step 266 at CPU0, the first load with UID=1 is unstalled (e.g. when its address calculation operands become available) and so then it issues a load request 268 to the memory system to obtain the data associated with address [P0] and in this example by the time that load request 268 is issued the data at [P0] has already been updated to the new value Y at step 264 in response to the second store of CPU1. This data Y is returned to CPU0 in response to the load request and then at step 270 the value prediction circuitry 14 checks whether the returned data matches the predicted value of the data at address [P0] that was predicted back at step 250, and in this case the prediction was correct and so it appears that the outcome of the younger load with UID=2 was also correct and so no operations will need to be re-executed.

However, actually the functional outcome of this example is incorrect because it violates the store ordering imposed by the store barrier on CPU1. This is because the second load on CPU0 has executed using the old data value A associated with address [R3] from before the older store was executed on CPU1 but due to the value prediction has it executed with a newer data value Y of the data at address [P0] which was updated by a younger store which follows the store barrier. Note that as the data in [P0] is merely being used as a flag which affects which particular byte of the cache line indicated by [R3] is accessed by the second load UID=2 on CPU0, the update of the data at [R3] to the new value B (which could be multiple bytes) performed by the first store on CPU1 may also change the value at address [R3+R1].

Effectively, this means that CPU0 has gained a view of memory which would have arisen if the younger store had bypassed the older store on CPU1 which would be in contravention with the store barrier, even though at CPU1 the younger store did not bypass the older store. This arises because while the second load on CPU0 is issued at step 252 and sees the value of the data at address [R3] that is consistent with the view of memory at that time, the second load has seen the value of the data at [P0] equivalent to a point in time in the future after step 264 when the data at [P0] was updated.

Figure 10:
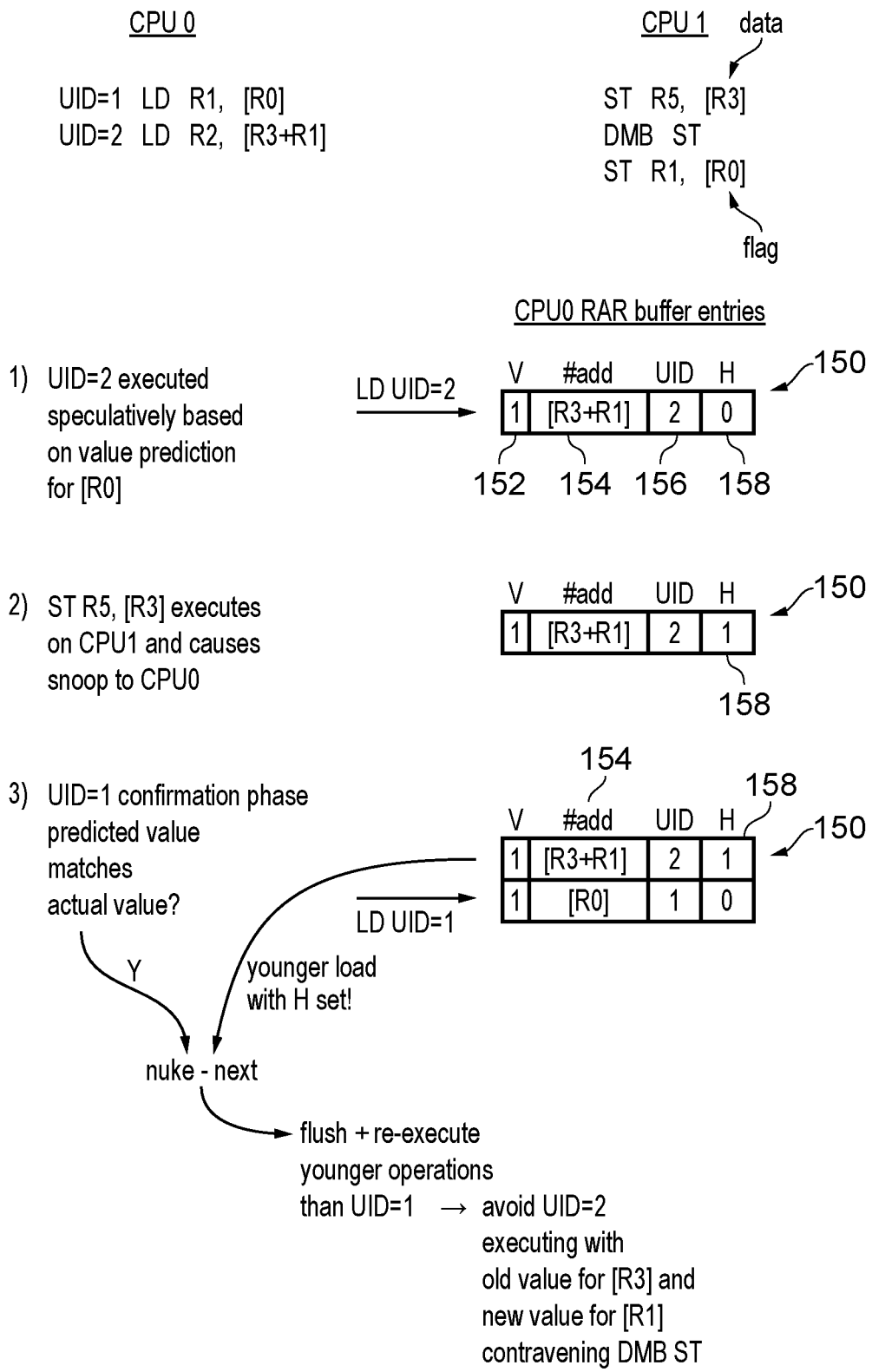
FIG. 10 illustrates an example of using the load tracking information to identify such ordering violations and cause operations to be re-executed to avoid the ordering violation.

FIG. 10 shows how the check performed at step 214 of FIG. 5 for a value-predicted load when its value prediction was correct can address this problem and prevent the ordering violation causing incorrect results. FIG. 10 is using the same worked example as shown in FIG. 9. The lower part of FIG. 10 shows the RAR buffer entries 150 which are updated in response to the operations seen at CPU0. At the first step shown in FIG. 10, after making the value prediction for UID=1, the second load with UID=2 is issued speculatively at CPU0 based on the predicted value for [P0]. Following the approach shown in FIG. 5, at step 202 an RAR buffer entry 150 is allocated for the load with UID=2, with the valid bit 152 set, the address field 154 set based on address [R3+R1], the UID field 156 set to 2 to match the UID of the second load and the hazard flag 158 initially set to 0. It is assumed in this example that there are no younger operations with RAR buffer entries indicating a hazard and so there is no need to flush at this point.

At step 2 of FIG. 10 when the first store operation is executed by CPU1 at step 256 of FIG. 9 to update the data value at address [R3], the write request sent to the interconnect 42 causes a snoop request to be sent from the interconnect 42 to the CPU0 specifying address [R3], and the address [R3] of this snoop request is compared by the load tracking circuitry 8 against addresses of entries in the RAR buffer to check whether any hazards have occurred. In this example as address [R3] corresponds to the same cache line as address [R3+R1] in the entry for UID=2, the hazard indication 158 is set for this RAR buffer entry 150.

Subsequently at step 3 the first load UID=1 on CPU0 is unstalled and initiates its confirmation phase to issue the load request 268 to read data from [P0]. Once the loaded value Y is returned then it is confirmed that the actual value of the target data matches the predicted value and so at step 214 of FIG. 5 the RAR buffer check is performed to check for hazarding entries relating to younger load operations, but there is no need to confirm that the address field 154 of those hazarding entries corresponds to the address of the value-predicted load with UID=1. Therefore, as the RAR buffer entry 150 for UID=2 indicates a younger load with the hazard indication 158 set (even though the entry for UID=2 has a different address [R3+R1] to the address [P0] in entry for UID=1), the load tracking circuitry 8 issues a "nuke-next" and flushes and re-executes operations younger than UID=1 to avoid UID=2 having been executed with the old value A for the data at address [R3] and the new value Y for the data at address [P0] contravening the store barrier on CPU1. Hence, the load for UID=2 will be flushed and later re-executed and at that point it will see the new values B, Y for the data at addresses [R3] and [P0], so there would be no ordering violation.

Hence, by converting a value-predicted load into a load with acquire semantics in its confirmation phase, so as to perform the same RAR buffer checks independent of address comparisons that would be done for loads with acquire semantics, this protects against potential ordering violations caused by value predictions.

Note that if the value at [P0] had not merely been a 1-bit flag, but had been a multi-bit value with sufficient number of bits that [R3+R1] would be in a different cache line to [R3], then there would be no incorrect result caused by an ordering violation, even if the value prediction for load UID=1 on CPU0 used a predicted value Y for [P0] which corresponds to the new value set by the second store on CPU0 but used the old value A for [R3] which does not take account of the first store on CPU0. In this case, although the second load UID=2 CPU0 has not considered the update made by the first store on CPU0 in its execution, this does not matter anyway because the cache line accessed by the second load [R3+R1] would be different to the cache line [R3] updated by the first store executed by CPU1, so that there is no intervening change to data in a cache line that is relevant to the execution of the second load on UID=2. The functional result will be the same as if no value prediction was made and the execution of the second load UID=2 was deferred until the actual value Y of the data at address [P0] was available. Hence, there would be no need to flush and re-execute in this scenario. In this scenario, the snoop at step 2 of FIG. 10 would specify address [R3] and the address [R3+R1] in address field 154 of the entry for UID=2 would be in a different cache line, so the hazard indication 158 would not be set and so there would be no need for a flush at step 3.

The techniques discussed above can also be used for other types of predictions made for load operations, other than value prediction. For example, these techniques can also be used where an address prediction is used to predict a target address of the load operation. A specific example of address prediction is memory renaming, where it is predicted whether the target address of the load operation corresponds to a target address of an earlier store operation from which store data can be forwarded as at least part of the load data to be loaded by the load operation.

Figure 11:
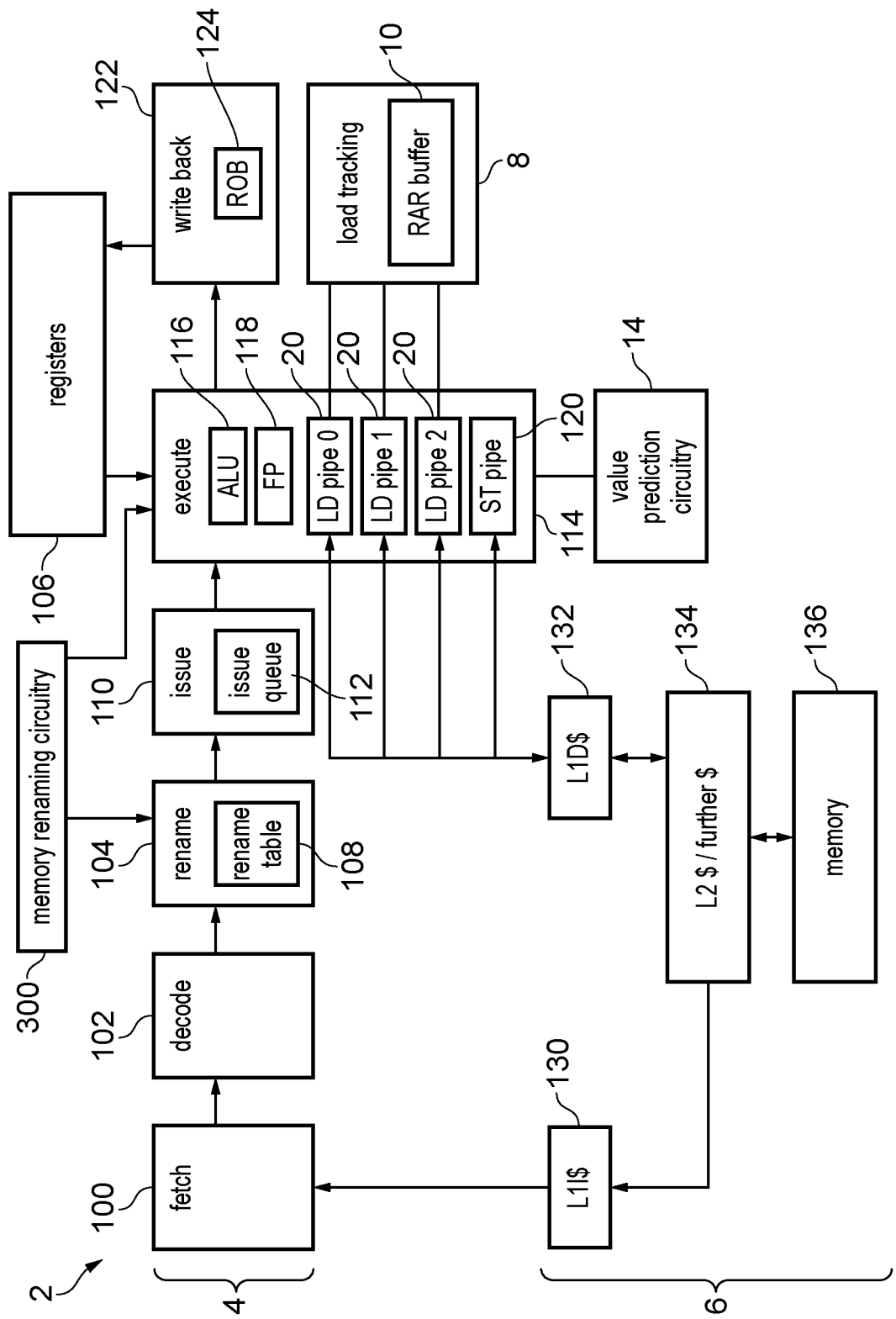
FIG. 11 illustrates an example of a data processing system having memory renaming circuitry.

FIG. 11 shows another example of a data processing system, which is the same as shown in FIG. 2, except that the system 2 also comprises memory renaming circuitry 300. The memory renaming circuitry 300 predicts whether a load target address of a load operation corresponds to a store target address of an older store operation from which the store data is capable of being used as at least part of the load data. If it is predicted that the load target address and store target address correspond and there is no intervening younger store to the same address bytes as the load that is younger than the older store but older than the load, so that at least part of the store data to be stored to the memory system 132, 134, 136 by the older store operation can be used as the load data to be loaded by the load operation, then a dependent operation depending on the load operation can be processed earlier even if address operands required for calculating the address of the predicted load operation are not ready yet.

The predictions made by the memory renaming circuitry 300 are based on memory renaming prediction information trained based on observing the target addresses of load and store operations previously executed. For example, the load/store pipelines 20, 120 may support store-to-load forwarding, where it is detected that the addresses of a pending store still awaiting storage of data to the memory system 132, 134, 136 and a younger load correspond (with no intervening store to the same address bytes as targeted by the load) so that the store data at least partially overlaps with the load data, in which case it is possible to process the load earlier by forwarding store data obtained from a store buffer as a result of the load operation.

In cases where store-to-load forwarding is possible, this is also an instance where memory renaming would have been possible at an earlier stage of the pipeline (at least for some scenarios depending on the relative overlap between the store data and load data). Some implementations may only support memory renaming in cases where the store data exactly overlaps with the load data (both start addresses and size match for the store and load). Other implementations could support memory renaming in the exact match case, and also support memory renaming in cases where the store data partially overlaps with the load data but the load can obtain all its data by forwarding from the store (i.e. store data size is larger than load data size and all the load data corresponds to bytes within the store data). It may not be possible to support memory renaming in cases where there is a partial overlap between store data and load data, but part of the load data does not overlap with the store data (even if partial store-to-load forwarding is possible in that case). Hence, memory renaming may be limited to certain examples of store-to-load forwarding, which may be restricted to a certain subset of overlap relationships between the store data and load data.

Hence, in response to detecting an instance of store-to-load forwarding for which the relative overlap between store data and load data is such that memory renaming is supported, information about the store and load operations with corresponding addresses may be stored to a training table by the memory renaming circuitry 300 (e.g. the training information could provide an indication of the program counter addresses of the store and load, or any other information which allows the corresponding pair of store and load to be identified). It will be appreciated that this is just one example of a possible training technique for training memory renaming circuitry 300, and in general any training technique can be used that allows correspondence between store and load target address to be predicted based on outcomes of previously seen operations.

Based on the memory renaming prediction information obtained by training, if the memory renaming circuitry 300 detects that the stream of instructions to be processed includes an older store and a younger load corresponding to a store-load pair predicted as corresponding by the memory renaming prediction information, then the memory renaming circuitry 300 performs an action to cause at least part of the store data of the store operation to be provided as the result of the load operation, allowing a further operation dependent on the load data obtained by the predicted load to be issued earlier, even if the load operation was still waiting for its address operands to be available (the address operands being any one or more values used to calculate the target address).

Once the load operation's address operands are available, the actual load target address of the predicted load is determined and the memory renaming circuitry 300 determines whether the prediction was correct (e.g. by comparing the actual load target address with the actual store target address of the older store, and confirming that there was no intervening store operation younger than the older store and older than the load, which writes to at least part of the addresses corresponding to the load data). If the prediction was correct, then performance has been improved compared to delaying the further dependent operation until the load's address operands were available. When the prediction is correct, there is no need to issue a load request to the cache/memory for the predicted load, but a confirmation load may still be issued to the RAR buffer 10 to check for ordering violations (as discussed further below). If the prediction was incorrect, the load operation itself and the operations younger than the load operation can be flushed from the pipeline and reissued.

An example instruction sequence where memory renaming could be useful is as follows:
Inst1: LD X1, [X0]
Inst2: ST X2, [X1]
Inst3: LD X3, [X1]
Inst4: LD X4, [X3].

Here, the notation [X0] means an address calculated based on the value in register X0.

In this example, the store Inst2 and the load Inst3 both have an address depending on the outcome of load Inst1, and the load Inst4 depends on the load Inst3. Therefore, if the load Inst1 is delayed due to waiting for the address operand X0 to be available or the data from address [X0] to be returned from the memory system, then all the subsequent operations Inst2, Inst3, Inst4 would have to wait until the data from address [X0] is available, if no prediction mechanism was supported.

However, in a system supporting memory renaming circuitry 300, if it has previously been observed that load instruction Inst3 and store instruction Inst2 have the same target address (in this case, due to both calculating their addresses based on [X1], but in other examples stores and loads could have corresponding addresses even if referencing different address operands), then the memory renaming circuitry 300 can predict that Inst3 will have a load target address corresponding to the store target address of Inst2, and therefore perform an operation equivalent to forwarding at least part of the store data of Inst2 as the load data returned for Inst3. This forwarding could be implemented in different ways. For example, in the case where the load data exactly overlaps with the store data (both starting addresses and data size match for the store and load), the load operation Inst3 could be replaced with a register move operation MOV X3, X2 which moves the data from register X2 (the source register of the store operation Inst2) to register X3 (the destination register of the load operation Inst3), eliminating the need for a load request to be sent to the memory system 132, 134, 136. Alternatively, if the address and data size of the load Inst3 are predicted to exactly match the address and data size of the store Inst2 so that all the store data can be forwarded to be the load data (a full overlap between store data and load data), the register rename stage 104 of the pipeline could update the rename table 108 to remap architectural register X3 to correspond to the same physical register 106 as currently mapped to architectural register X2, to eliminate the need for a register move operation to be issued and executed by the processing pipeline 4. If memory renaming is supported in cases where there is only a partial overlap between store data and load data the forwarding could be achieved in a different way—e.g. by replacing the load with one or more instructions which mask part of the store data and/or rotate or shift the store data when writing to the destination register of the load, to account for relative alignment between the store data and load data.

Regardless of how the memory renaming circuitry 300 implements the memory renaming operation to cause the store data from Inst2 to be used as the result of the load Inst3, by performing the memory renaming, this allows the data for register X3 to be available earlier so that the dependency of Inst3 on Inst1 is broken, allowing the younger dependent operation Inst4 which depends on Inst3 to proceed earlier, improving performance.

However, when memory renaming is used, a similar problem can arise to the one shown in FIG. 9 for value predicted loads, where despite the memory renaming prediction being found to be correct, nevertheless it is possible for an ordering violation to occur.

For example, consider the case where the instruction sequence shown above is executed on one processor core while a further instruction sequence is executed on a second processor core:

| Core 0 | Core 1 |
| --- | --- |
| Inst1: LD X1, [X0] | Inst5: ST X5, [X3] |
| Inst2: ST X2, [X1] | DMB |
| Inst3: LD X3, [X1] | Inst6: ST X6, [X0] |
| Inst4: LD X4, [X3]. | |

As in the example of FIG. 9, for ease of understanding, the same register numbers have been used on the two cores to indicate addresses having the same value on both cores, but in practice the ordering violation could arise even if the addresses on core 0 and core 1 were calculated based on address operands stored in different register numbers. Hence, [X3] on core 0 and [X3] on core 1 are assumed to refer to the same addresses. Similarly, [X0] on core 0 and [X0] on core 1 are assumed to refer to the same addresses.

With this example, an ordering violation could occur in the following scenario:
(1) Inst1 is stalled awaiting the address operands for calculating address [X0] and/or return of load data from address [X0];
(2) The memory renaming circuitry 300 breaks the dependency of load operation Inst3 on load operation Inst1 by predicting that Inst3 will have the same address as the store operation Inst2. Accordingly, load Inst4 is speculatively issued based on an address calculated using the store data in X2 as the predicted value of the address operand X3 for calculating address [X3]. The data loaded from address [X3] is stored in register X4. This is based on the old value of the data at address [X3], prior to Inst5 being executed at Core 1.
(3) After Inst4 has loaded data from address [X3], both Inst5 and Inst6 execute at Core 1 to update the data at addresses [X3] and [X0] to new values.
(4) Inst1 completes at Core 1 and returns the new value for [X0] and writes it to register X1.

(5) The address operand X1 is now available for store Inst2 and load Inst3, and a store request to request that data in register X2 is stored to address [X1] in memory is issued (address [X1] being calculated based on the new data for [X0] loaded by Inst1).

(6) To check whether the prediction made for Inst3 was correct, the addresses for store Inst2 and load Inst3 are compared and found to be the same, and so the memory renaming prediction made at step (2) was correct—the store data in X2 could indeed be used as the load data loaded to X3 by Inst3, to eliminate the need to actually issue a load request to the memory system 130, 132, 134 for Inst3.

As the memory renaming prediction was correct, one would think that there is no need to flush any instructions. However, actually an ordering violation has occurred, because Inst4 was based on the old data value at [X3] prior to the update by Inst5, but (via the dependency on Inst1 via Inst3) the new data value for [X0] updated by Inst6. The older store Inst2 will have written to an address [X1] determined based on the new data at address [X0] set by Inst6, while the younger load Inst4 saw the old value of the data at address [X3] ignoring the update made by Inst5. This behaviour would contravene the barrier DMB executed by Core 1 which requires that the update at Inst6 is only visible to observers who would also observe the updated value for Inst5

This problem can be addressed using the technique described earlier for load value predictions. The memory renaming circuitry 300 and/or the load tracking circuitry 8 can determine whether the prediction made for a predicted load operation (e.g. the memory renaming prediction made for Inst3) is correct, and determine whether the tracking information indicates that, for a given load operation younger than the predicted load operation (e.g. Inst4 above) which is issued before it is known whether the prediction is correct, there is a risk of second target data associated with a second target address of the given load operation having changed after the second target data was loaded by the given load operation (as in the case where the data for [X3] changed after issuing Inst4 above). Independent of whether the first target address of the predicted load operation ([X1] for Inst3) corresponds to the second target address of the given load operation ([X3] for Inst4), re-processing of at least the given load operation is requested when the prediction for the predicted load operation (Inst3) is correct and the tracking information is determined to indicate that there is a risk of the second target data (data for [X3]) having changed after the second target data was loaded by the given load operation (Inst4). This allows Inst4 to be flushed and re-issued to ensure that it sees the correct view of memory respecting the ordering requirements of the DMB at core 1.

Figure 12:
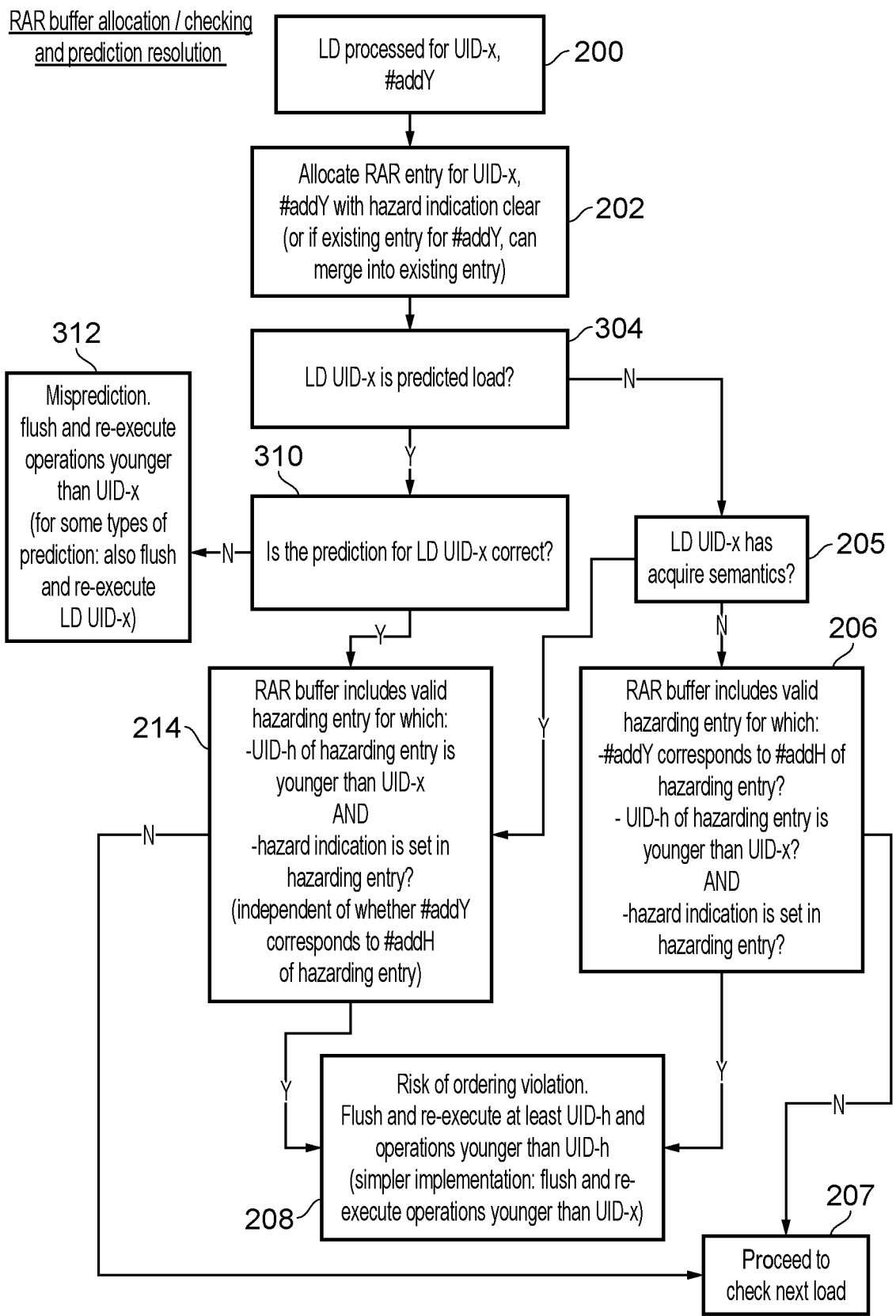
FIG. 12 is a flow diagram illustrating another example of maintenance of load tracking information in the RAR buffer and checking for whether an ordering violation may have occurred.

FIG. 12 is a flow diagram showing use of the load tracking information in the RAR buffer 10 for checking for ordering violations. All steps shown with the same reference numeral as in FIG. 5 are the same as described earlier for FIG. 5. However, in FIG. 12:

Step 204 is replaced with step 304 to check whether the load with UID-x is a predicted load subject to any type of prediction for determining a predicted behaviour of the load which could be used to allow an operation depending on the load to issue early based on the prediction without waiting for the actual behaviour of the load to be known. For example, the prediction could be the value prediction described earlier, the memory renaming prediction described above with respect to FIG. 11, or any other type of prediction made for a load operation which is used to break a chain of dependency between instructions.

Step 210 is replaced with step 310 which checks whether the prediction made for the load with UID-x is correct. For example, this could be checking whether the actual value of the load target data loaded for a value-predicted load matches the predicted value of the load target data predicted for the load by value prediction. Also, this could be checking whether the address operands for the predicted load are such that the load target address of the predicted load corresponds to a store target address of an older store operation when there are no intervening store operations which write to the same bytes to be loaded by the load operation, in the case where memory renaming circuitry 300 is used to make the prediction. For memory renaming, the determination of whether the prediction is correct could also depend on other parameters, such as the sizes of the load data and store data.

Step 312 of FIG. 12 is as in step 212 of FIG. 5, but the misprediction is now a general type of misprediction, rather than specifically a load value misprediction as in FIG. 5. For example, the misprediction could also be an address prediction for predicting the address of a load (e.g. based on training data set based on addresses for previous loads), or a memory renaming misprediction where it is determined, based on any address operands of the predicted load once available, that the load target address did not in fact correspond with the store target address so that a younger operation performed speculatively based on the prediction that the store data could be reused as the load data was processed incorrectly. For some types of prediction (e.g. load value prediction), when a misprediction is detected then at step 312 any operations younger than the mispredicted load with UID-x are flushed and re-executed, but it is not necessary to re-execute the load itself because the confirmation load will already have obtained the correct value of the load data. For other types of prediction (e.g. address prediction, including memory renaming), the load with UID-x is also flushed and re-executed, to ensure the correct data is obtained.

All other steps of FIG. 12 are the same as in FIG. 5, and hence the RAR buffer is used in the same way as described earlier to track whether an ordering violation has occurred, even when the prediction is a memory renaming prediction or other type of prediction. Hence, it will be appreciated that all of the features mentioned earlier in relation to a load predicted by value prediction can also be applied to a predicted load operation for which another type of prediction, such as memory renaming, is performed. References to a "value-predicted load operation" can be replaced with "predicted load operation". References to determining whether the actual value of the first target data matches the predicted value of the first target data (or similar wording) can be replaced with determining whether the prediction made for the predicted load operation is correct.

Applying the technique of FIG. 12 to the example instruction sequence using memory renaming as discussed above would mean that:

at step (2), when Inst4 executes, an RAR buffer entry is allocated for Inst4 specifying UID-4, address [X3] and the hazard indication clear, according to step 202 of FIG. 12.

at step (3), when the store Inst5 executes at Core 1, this causes a snoop for address [X3] to be issued to Core 0, causing the hazard indication to be set in the RAR buffer entry allocated for UID-4 and address [X3].

at step (6), when the confirmation load for the predicted load Inst3 is issued to the RAR buffer to check for ordering violations, it is detected that the prediction for load Inst3 was correct (Y at step 310 of FIG. 12), but that the RAR buffer contains a valid hazarding entry for a younger load (UID-4 for Inst4, which is younger than UID-3 for Inst3) with the hazard indication being set (Y at step 214 of FIG. 12), and therefore at step 208 the load Inst4 with UID-4, and any younger operations than UID-4, are flushed and re-executed according to step 208 of FIG. 12.

Hence, the ordering violation mentioned earlier is avoided.

The above example discusses memory renaming, which is a specific form of address prediction. It is also possible to apply the technique to other forms of address prediction which do not use memory renaming. For example, address prediction circuitry can maintain a training table based on target addresses of load operations seen previously, and use that training table to predict the target addresses of load operations seen again later (this prediction can be independent of whether that load operation corresponds to the same target address as an older store as in the memory renaming case). Hence, the prediction at step 304 of FIG. 12 could be an address prediction of the target address of a load, obtained through a technique other than memory renaming, and the checking of whether the prediction is correct at step 310 can be checking, once the address operands of the load are available, whether the correct target address of the load matches the predicted address.

As shown in the examples discussed above and in further examples below, an apparatus may comprise processing circuitry to issue load operations to load data from a data store; load tracking circuitry to maintain tracking information for one or more load operations issued by the processing circuitry; and load prediction circuitry to determine a prediction for enabling a load operation to be speculatively issued ahead of an older load operation based on the prediction before it is known whether the prediction is correct. For example, the prediction could be any of:

a load value prediction, for predicting the value of the data loaded by a particular load operation. In this case, the load operation which is speculatively issued based on the load value prediction may be a further load operation which is dependent on the particular load operation for which the load value prediction was made.

a memory renaming prediction, which is a particular example of a load value prediction, where the memory renaming prediction predicts whether the target address of a load operation corresponds to the store target address of an older store operation, and if so predicts that the value of the data to be loaded from the data store by the predicted load operation should be the value of the corresponding store data to be stored to the data stored by the older store operation. In this case, the load operation which is speculatively issued based on the memory renaming prediction may be a further load operation which is dependent on the particular load operation for which the memory renaming prediction was made.

an address prediction, for predicting the address from which data is to be loaded by a particular load operation. In this case, the load operation which is speculatively issued based on the address prediction may be the address-predicted load operation itself.

These are all forms of load prediction which may allow a particular load operation to be speculatively issued ahead of an older load operation (a load operation preceding that particular load operation in program older). This differs from other types of prediction, such as branch prediction, which may allow a load operation to be performed speculatively, but which would not cause a change of order of handling the loads compared to program order or the dependency order implied by dependencies between the loads.

Such predictions which allow a load operation to be speculatively issued to bypass an older load operation can risk violations of memory ordering requirements, because there is a risk that the speculatively issued load operation may have been dependent on the older load operation and an update made to data in memory in the period between processing the speculatively issued load operation and processing the older load operation may cause the younger speculatively issued load operation to see an old value prior to the update while the older load operation sees a newer value after the update. This can risk breaching ordering requirements imposed by instructions being executed at other processor cores.

While one would normally expect that such ordering violations may occur only if the older load and younger load handled out of order are to the same address, in the case where the younger load bypassed the older load due to a prediction and there is a dependency between the loads, the ordering violation may occur even if the younger load does not target the same address as the older load.

Risk of such ordering violations can be mitigated against by providing load tracking circuitry configured to:

determine whether the tracking information indicates that there is a risk of target data, corresponding to an address of a speculatively-issued load operation which is speculatively issued based on the prediction determined by the load prediction circuitry, having changed between the target data being loaded for the speculatively-issued load operation and data being loaded for a given older load operation bypassed by the speculatively-issued load operation; and in response to determining that the tracking information indicates that that there is a risk of the target data having changed between the target data being loaded for the speculatively-issued load operation and data being loaded for the given older load operation, and independent of whether the address of the speculatively-issued load operation corresponds to an address of the given older load operation, request re-issuing of at least the speculatively-issued load operation, even when the prediction for the speculatively-issued load operation is correct.

Various examples of this are described above and below. Hence, even if the prediction for the speculatively-issued load operation is correct, so one would expect there is no need to re-issue the speculatively-issued load operation, at least the speculatively-issued load operation is nevertheless re-issued if the tracking information indicates that there is a risk of the target data corresponding to the address of the speculatively-issued load operation having changed between being loaded for the speculatively-issued load operation and data being loaded for the older load operation bypassed by the speculatively-issued load operation. This provides a technique for avoiding ordering violations in the systems supporting load predictions.

In some cases, the ordering violations may only arise if the speculatively-issued load operation is actually dependent on the given older load operation that it bypassed, when target data of the speculatively-issued load operation changed in the period between processing of the speculatively-issued load operation and processing of the given older load operation. Hence, some implementations may include, as an additional criterion for determining whether to request re-issuing of at least the speculatively-issued load operation, a check of whether the speculatively-issued load operation is dependent on the given older load operation. For example, the dependency could be a register dependency where the speculatively-issued load operation uses, as a source operand, the value loaded by the given older load operation or a value generated by one or more intervening instructions based on the value loaded by the given older load operation.

However, in other examples, the determination of whether to re-issue at least the speculatively-issued load operation may be independent of whether the speculatively-issued load operation is dependent on the given older load operation. As mentioned above for the load value prediction example, by not checking for whether the load operations are dependent, this simplifies circuit implementation.

If, based on the tracking information, it is determined that the speculatively-issued load operation should be re-issued, if one or more younger operations (younger in program order than the speculatively-issued load operation) have already been processed, those operations may also be re-issued.

Also, in some implementations, although intervening operations which are younger than the given older load operation but older than the speculatively-issued load operation do not need to be re-issued in order to deal with a potential ordering violation, it may nevertheless be simpler to also request re-issuing of these intervening operations, so these can optionally also be re-issued if the speculative-issued load operation needs to be re-issued.

As shown in the above and below examples, the load tracking circuitry may maintain, as the tracking information, a tracking structure comprising one or more tracking entries. A tracking entry allocated for a given load operation specifies at least: an age indicator indicative of relative age of the given load operation; address information indicative of an address of the given load operation; and a hazard indication indicative of whether a hazard condition has been detected for the given load operation. The address information could be imprecise, so does not need to indicate the address at the same granularity as the target address is identified for the given load operation. For example, the target address may support byte-level addressing of individual bytes of data in the data store, but the address information maintained in the tracking information could be maintained at cache-line granularity.

The load tracking circuitry may set the hazard indication for a given tracking entry of the tracking structure to indicate that the hazard condition has been detected, in response to detecting a coherency snoop request specifying a snoop address corresponding to the address information specified by the given tracking entry. The load tracking circuitry may determine that the tracking information indicates that there is a risk of the target data having changed between the target data being loaded for the speculatively-issued load operation and data being loaded for the given older load operation bypassed by the speculatively-issued load operation, when a lookup of the tracking structure performed in response to issuing of the given older load operation determines that the tracking structure includes a hazarding tracking entry for which the age indication indicates a younger load operation than the given older load operation and the hazard indication indicates that the hazard condition has been detected for the younger load operation. With this approach, updates to memory which could risk an ordering violation where a speculatively-issued younger load operation has seen an old value prior to the memory update but an older load operation on which the speculatively-issued load operation depends has seen a newer value after the memory update can be detected using a relatively simple set of tracking information which does not require complicated dependency tracking.

The apparatus may have a plurality of processors each having access to a shared data store, each processor comprising the processing circuitry, and at least one of said plurality of processors may comprise the load tracking circuitry and the load prediction circuitry. It is not essential for each processor to have the load tracking circuitry and load prediction circuitry. One or more processors may not have load prediction circuitry capability. It can be useful to use the load tracking circuitry in a processor which has load prediction circuitry and is part of a multi-processor system, as in this case there can be a risk of ordering violations when one of the other processors updates data accessed by a load which, due to a prediction, bypassed an older load on which it depends.

In some cases, whether an architectural ordering requirement has been breached due to the prediction causing an older load to be bypassed by a younger speculatively-issued load may depend not only on the handling of the loads at the processor core which has the load prediction circuitry, but also on which particular instructions are executed at another processor core. For example, an ordering requirement may arise only if a certain class of instructions imposing memory barriers or other ordering requirements is executed at the other core. However, as the processor core having the load prediction circuitry may not be able to know which instructions are being executed at another processor core, the checks performed by the load tracking circuitry may assume the worst case scenario that the instructions at the other core are such that an ordering requirement may be present, without actually checking for what instructions are being executed at the other core. Therefore, in some cases the load tracking circuitry may cause load operations to be re-issued even when the instructions at the other core are such that there would not actually have been any breach of an ordering requirement. Nevertheless, it can be safer to trigger re-issuing of loads when the prediction causes a younger load which bypassed an older load to see old data while newer data has been generated for that address by the time the older load is processed, just in case there is an ordering requirement at the other core that could be violated.

In some examples, the load tracking circuitry may perform, in response to the given older load operation, a lookup of the tracking information for determining whether there is a risk of the target data corresponding to the address of the speculatively-issued load operation having changed between the target data being loaded for the speculatively-issued load operation and data being loaded for a given older load operation bypassed by the speculatively-issued load operation. By performing the lookup of the tracking information for determining whether there is a risk of an ordering violation with respect to a younger load which bypassed the older load, as part of the response to the given older load operation itself, this can avoid a need for a confirmation load to be issued when the prediction for the younger speculatively-issued load is resolved. This can be particularly useful for forms of prediction such as address prediction where the prediction is of a property of the younger speculatively-issued load itself, rather than a property of an older load on which the speculatively-issued load depends (as for load data value prediction, say). By avoiding the need to issue a confirmation load purely for triggering a lookup of the tracking information once the prediction has been resolved as correct for the speculatively-issued load operation, this helps to reduce the pressure on bandwidth in the processing circuitry and/or load tracking circuitry, which may have a limited number of slots available for handling load operations at a given time. This means performance can be improved because the slot which would otherwise have been used for the confirmation load can instead be used for a non-confirmation load. As loads may be speculatively-issued relatively frequently, the number of slots saved by avoiding a confirmation load for each speculatively-issued load can be relatively high and so this may provide an appreciable performance improvement across a given program workload.

The tracking information for a given load operation may specify whether a hazarding check for the given load operation and another older load operation should be performed independent of an address comparison between address information of the given load operation and address information of the other older load operation. For the speculatively-issued load operation, the load tracking circuitry is configured to set the tracking information to specify that the hazarding check for the given load operation should be performed independent of the address comparison. By including some information in the tracking information which specifies whether the hazarding check should be address-independent, this can help support the ability for the lookup of the tracking information for detecting the ordering violations of the type described above to be performed in response to the given older load operation rather than a confirmation load operation issued when the prediction is resolved for the speculatively-issued load operation. For example, at least for speculatively-issued loads, the tracking information may be set to specify that a hazarding check for that load (a check of whether that load hazards against another load) should be independent of the address information specified for that load. Hence, in a hazarding check between a first older load operation and a second younger load operation that bypassed the first older load operation, in response to a determination that the tracking information for the second younger load operation specifies that the hazarding check should be performed independent of the address comparison, the load tracking circuitry is configured to determine whether to flush at least the second younger load operation independent of an address comparison between addresses of the first older load operation and the second younger load operation. As mentioned above, as well as the second younger load operation, younger operations than the second younger load operation (if there are any already processed), and in some implementations intervening operations between the first older load operation and the second younger load operation, may also be flushed when the second younger load operation is flushed.

In some examples, the load tracking circuitry is configured to maintain, as the tracking information, a tracking structure comprising one or more tracking entries; a tracking entry allocated for a given load operation specifying at least: an age indicator indicative of relative age of the given load operation; address information indicative of an address of the given load operation; a hazard indication indicative of whether a hazard condition has been detected for the given load operation; and an address check skip indication indicative of whether a hazarding check for the given load operation and an older load operation should be performed independent of an address comparison between the address information for the given load operation and address information of the older load operation. The address check skip indication is a particular example of the information specifying that the hazarding check should be independent of the address comparison.

For a speculatively-issued load operation, the load tracking circuitry may set the address check skip indication of a corresponding tracking entry to a first state indicating that the hazarding check for the speculatively-issued load operation should be independent of the comparison of the address information. For a non-speculatively-issued load operation, the load tracking circuitry may set the address check skip indication to a second state indicating that the hazarding check should be dependent on the comparison of the address information.

In response to issuing of a particular load operation, the load tracking circuitry may look up the tracking structure and:

in response to determining that the tracking structure includes a tracking entry for which the age indication indicates a younger load operation than the particular load operation, the hazard indication indicates that the hazard condition has been detected for the younger load operation, and the address check skip indication is in the first state, the load tracking circuitry may trigger, independent of the address comparison between address information of the particular load operation and the address information of the younger load operation, a flush to request re-issuing of at least the younger load operation. Again, operations younger than the younger load operation (if there are any already processed), and/or intervening operations older than the younger load operation but younger than the particular load operation, may also be flushed; and in response to determining that the tracking structure includes a tracking entry for which the age indication indicates a younger load operation than the particular load operation, the hazard indication indicates that the hazard condition has been detected for the younger load operation, and the address check skip indication is in the second state, the load tracking circuitry is configured to determine, depending on an address comparison between address information of the particular load operation and the address information of the younger load operation, whether to trigger a flush to request re-issuing of at least the younger load operation.

Hence, the address check skip indication controls whether the hazarding check used to determine whether to trigger a flush is performed dependent on a comparison of address information (e.g. for standard hazarding checks to avoid incorrect ordering between loads to the same address) or independent of the comparison of address information (e.g. for hazarding checks performed for a speculatively-issued load which was executed ahead of an older load due to a prediction, so that potential ordering violations can be detected even when the older load did not access the same address as the speculatively-issued load).

Again, the address information could be imprecise, e.g. tracked at a cache-line or block granularity, so if the address comparison is required, the address comparison may detect a match and so trigger a flush even if the loads involved did not actually target the same address but specified different addresses in the same cache line or block. Tracking the address information at a coarser granularity can reduce the amount of tracking information that is stored. Hence, a system designer may choose the address information tracking granularity to trade off increased risk of some false positive ordering violation detections against the circuit area and power overhead savings available by storing coarser-grained tracking information.

In some examples, the prediction provided by the load prediction circuitry is a prediction enabling the speculatively-issued load operation to bypass the given older load operation even when the speculatively-issued load operation is dependent on the older load operation. In this case there is risk of ordering violations caused by the broken dependency, due to an older load being bypassed in dependency ordering by the younger dependent load. However, it is not essential for the lookup of the tracking information to check whether the speculatively-issued load operation is actually dependent on the older load operation, which could be complex to implement in circuitry and it may be preferable to perform the hazarding checks for ordering violation detection independent of whether there is a dependency between the loads being checked. This could mean that sometimes a load may be flushed even though it was not dependent on an older load which it bypassed and so there would not actually have been an ordering violation.

The approach discussed above (of using the address check skip indication or other form of tracking information to determine whether to make the hazarding check depend on a comparison of address information) can be particularly useful for a form of load prediction where the predicted property is a property of the speculatively-issued load itself, rather than an older load on which the speculatively-issued load depends, as this avoids the need for a confirmation load to be processed when the prediction is resolved. For example, this can be particularly useful for examples where the load prediction circuitry comprises address prediction circuitry to determine a predicted target address of the speculatively-issued load operation.

However, in other examples, the load tracking circuitry may perform, in response to a confirmation load operation issued for the first load operation in response to determining a correct outcome for the prediction, a lookup of the tracking information for determining whether there is a risk of the target data corresponding to the address of the speculatively-issued load operation having changed between the target data being loaded for the speculatively-issued load operation and data being loaded for the given older load operation bypassed by the speculatively-issued load operation. In this case, one of the earlier described examples (which checks the tracking information on a confirmation load, and does not use the address check skip indication) could be used.

For example, this can be useful where the load prediction circuitry comprises value prediction circuitry to determine a predicted value of data to be loaded from the data store by a first load operation, and the speculatively-issued load operation comprises a second load operation dependent on the data to be loaded by the first load operation.

A special case of value prediction may be where the value prediction circuitry comprises memory renaming circuitry to predict whether the target address of the first load operation corresponds to a store target address of an older store operation for storing store data to the data store, and when the target address of the first load operation is predicted to correspond to the store target address, to predict, as the predicted value of data to be loaded from the data store by the first load operation, the store data of the older store operation.

Figure 13:
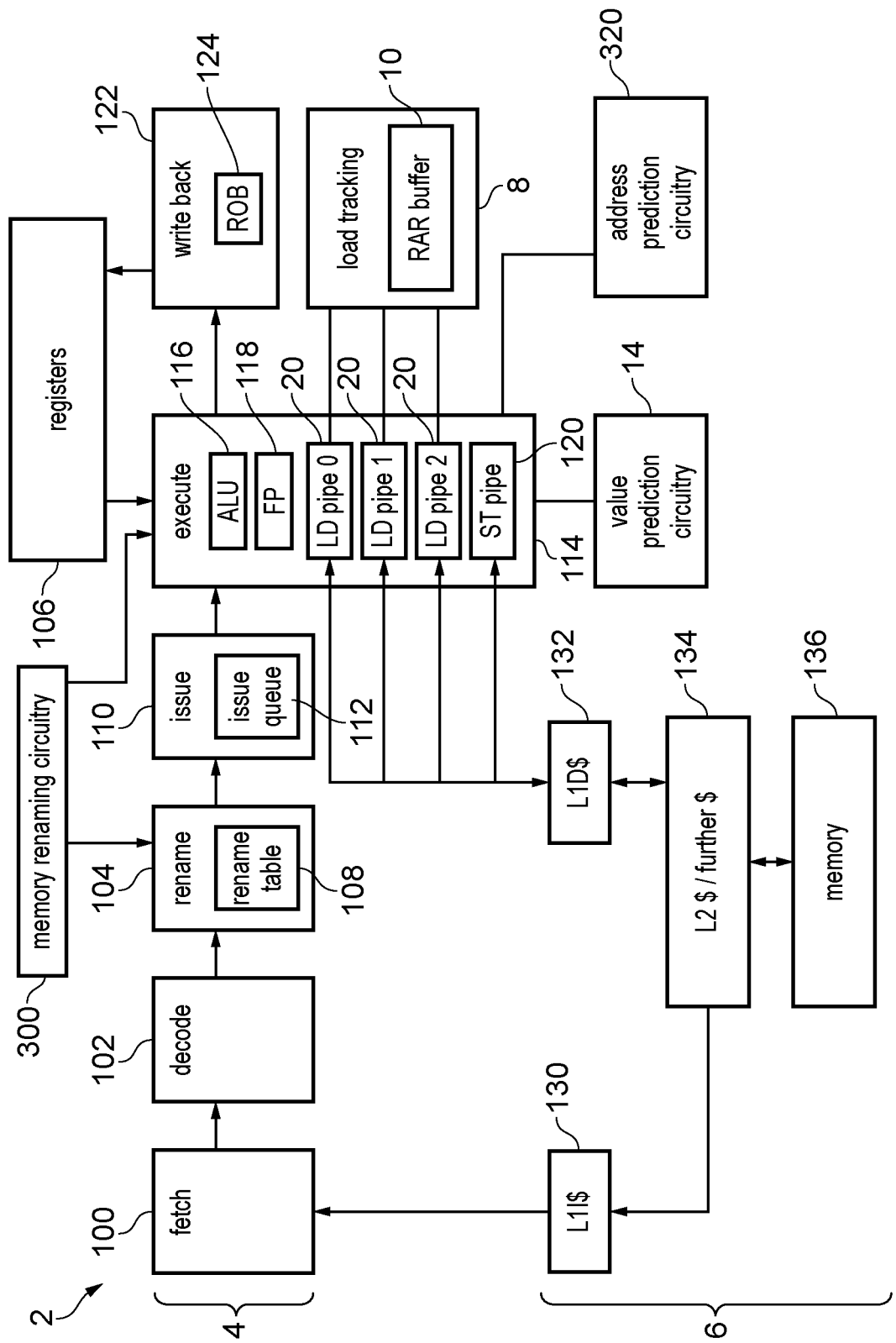
FIG. 13 illustrates an example of a data processing system having various examples of load prediction circuitry.

FIG. 13 illustrates another example of a data processing apparatus 2, which is the same as shown in FIG. 11, except that the system 2 also comprises address prediction circuitry 320. The address prediction circuitry 320 predicts a target address for a load operation to allow the load operation to be issued before one or more operands for calculating the address are available. This can allow a dependency of the load operation on an earlier operation (which could itself be another load) to be broken. The address prediction can be made based on prediction state information learnt from target addresses of previous load operations. For example, a prediction structure mapping program counter addresses of loads to corresponding target addresses could be used to generate the address predictions, with the prediction structure being updated based on previously seen target addresses for loads at particular program counter addresses. In another example, the address prediction circuitry 320 could detect stride patterns of load target addresses (which may, for example, be common when a loop is executed where each iteration of the loop loads from an address offset by a stride offset from the address used for a previous iteration), and use the detected stride offset to predict target addresses for future loads. By allowing load operations to be issued (including initiating load requests to the memory system 132, 134, 136) before the address operands are available, then when the prediction is correct performance can be improved because the load value is available sooner for use by dependent operations. If the address prediction is incorrect, the value returned for the predicted load can be discarded and the load re-issued when the correct address is known.

Hence, the address prediction circuitry 320 is another example of load prediction circuitry which is able to break dependencies between loads so that a younger load which is dependent on older load may, based on a prediction, be issued ahead of the older load despite the dependency. Other examples of such load prediction circuitry include the value prediction circuitry 14 and the memory renaming circuitry 300. However, in each case, breaking the dependency based on the prediction risks an ordering violation if the value loaded from the memory system 132, 134, 136 by the younger load changes before the older load loads its data.

To enable such potential ordering violations to be detected, load tracking circuitry 8 maintains tracking information for one or more load operations issued by the processing circuitry. As in the earlier examples, in FIG. 13 the tracking information is maintained in a read after read (RAR) buffer 10. For each tracked load, the tracking information may specify at least an age indicator indicating relative age of the load operation, address information indicative of an address of the load operation, and a hazard indication indicating whether hazard condition has been detected for the given load operation. The hazard indication may be set for a given tracking entry of the tracking structure when a coherency snoop request is detected specifying a snoop address corresponding to the address information in the given tracking entry.

Figure 14:
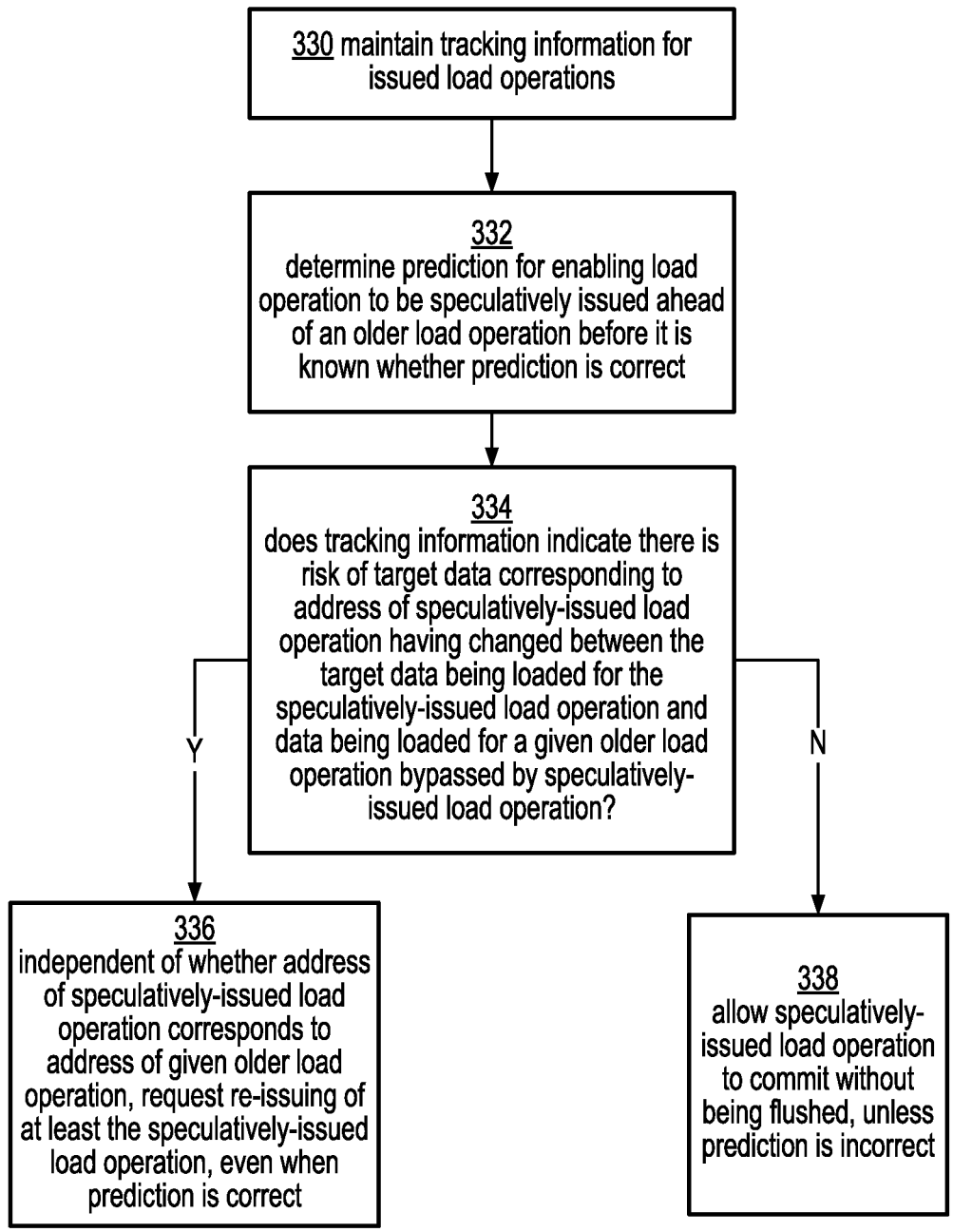
FIG. 14 is a flow diagram illustrating an example of use of tracking information to protect against possible ordering violations when a prediction enables a load operation to be speculatively issued ahead of an older load operation.

FIG. 14 is a flow diagram illustrating use of the tracking information to detect potential ordering violations. At step 330, the load tracking circuitry 8 maintains the tracking information for load operations issued for processing by the issue stage 110. At step 332, load prediction circuitry 14, 300, 320 determines a prediction for enabling a load operation to be speculatively issued ahead of an older load operation before it is known whether the prediction is correct. For example, the load prediction could be an address prediction or a load value prediction (a particular subclass of the load value prediction being the memory renaming prediction made by memory renaming circuitry 300).

At step 334, the load tracking circuitry 8 determines whether the tracking information maintained in the RAR buffer 10 indicates that there is a risk of target data corresponding to an address of a speculatively-issued load operation having changed between the target data being loaded for the speculatively-issued load operation and data being loaded for a given older load operation which was bypassed by the speculatively-issued load operation. If so, then at step 336, independent of whether an address of the speculatively-issued load operation corresponds to an address of the given older load operation, the load tracking circuitry 8 requests re-issuing of at least the speculatively-issued load operation, even when the prediction is correct. This helps avoid scenarios such as those discussed above where an update to the target data triggered by another processor core in the period between being loaded by the speculatively-issued load operation and the bypassed older load operation loading its data causes an ordering violation when the speculatively-issued load operation depends on the older load operation.

If the load tracking circuitry 8 determined that there was no risk of the target data corresponding to the address of the speculatively-issued load operation having changed between being loaded for the speculatively-issued load operation and the data being loaded for a given older load operation which was bypassed by the speculatively-issued load operation, then at step 338 the speculatively-issued load operation is allowed to commit without being flushed and re-issued, unless the prediction turns out to be incorrect.

The subsequent examples show a particular embodiment of the technique shown in FIG. 14, which can be particularly helpful for types of load prediction where the prediction relates to a property of the speculatively-issued load itself (rather the property of an earlier operation on which the speculatively-issued load depends). An example of this type of load prediction is the address prediction performed by the address prediction circuitry 320.

Figure 15:
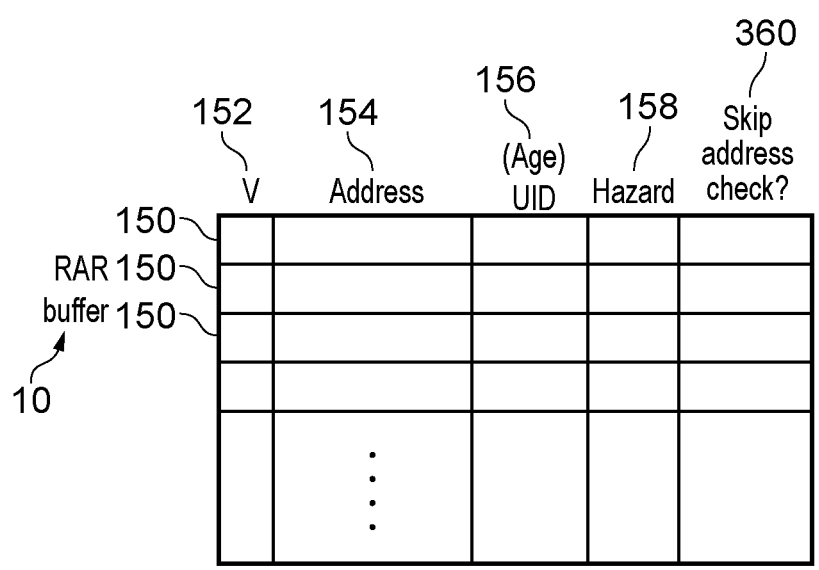
FIG. 15 illustrates RAR buffer entries comprising an address check skip indication.

FIG. 15 illustrates another example of tracking entries 150 maintained in the RAR buffer 10 by the load tracking circuitry 8. Each tracking entry 150 includes all the information previously described in FIG. 4 (including the valid indication 152, address information 154, age indication 156 and hazard indication 158) but also includes an address check skip indication 360 which indicates whether a comparison of the address information 154 can be omitted when performing a hazarding check for the load represented by that tracking entry 150 and an older load. The address check skip indication 360 can be set to a first state (e.g. 1) for address-predicted loads and can be set to a second state (e.g. 0) for loads not predicted using address prediction (e.g. non-predicted loads or loads predicted using value prediction or memory renaming). The hazard indication 158 is set in the same way as shown in FIG. 7, based on detection of snoop requests.

Figure 16:
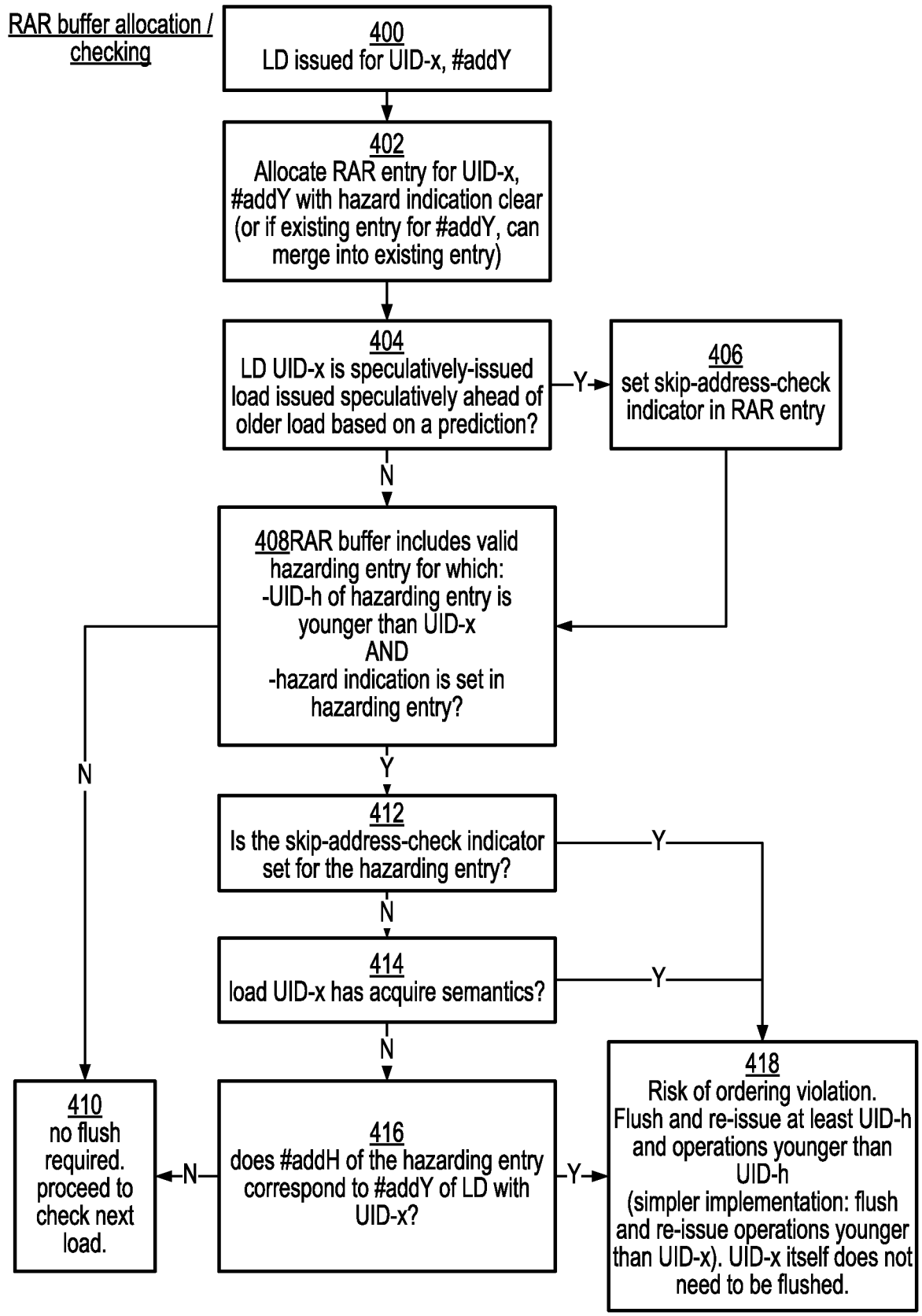
FIG. 16 is a flow diagram showing use of the address check skip indication for checking whether an ordering violation may have occurred.

FIG. 16 illustrates a flow diagram showing steps for allocating entries into the RAR buffer 10 and checking for hazards and potential ordering violations. At step 400 the load tracking circuitry 8 detects that a load operation is issued which specifies a given UID (UID-x) and a certain target address #addY. In response, at step 402 the load tracking circuitry allocates a new RAR buffer entry, with the valid bit 152 set, the address field 154 set based on target address #addY, the age indication 156 set based on UID-x, and the hazard indication 158 initially clear. Alternatively, if there is an existing entry for address #addY it is possible to merge the new request in to the existing entry, for example by updating the age field 156 to specify the UID of the younger UID of the UID currently in the age field 156 of the merged entry and the UID-x of the load currently being processed. At step 404, the load tracking circuitry 8 determines whether the load operation having UID-x is a speculatively-issued load which is issued speculatively ahead of an older load based on a prediction. If so, then at step 406 the skip-address-check indicator 360 in the RAR buffer entry 150 allocated for the load is set to a first state (e.g. 1) and otherwise step 406 is omitted and the skip-address-check indicator 360 remains in a second state (e.g. 0).

Steps 408, 412, 414, 416 collectively represent a hazarding check performed between the current load UID-x and an older load. The check can be performed either dependent on an address comparison at step 416 or independent of the address comparison.

At step 408, the load tracking circuitry 8 checks whether the RAR buffer 10 includes a valid hazarding entry for which the UID field 156 specifies a UID-h which is younger than UID-x and the hazard indication 158 is set to indicate that a hazard has occurred. If there is no such hazarding entry, then at step 410 no flush is required and the load tracking circuitry 8 can proceed to check the next load to be issued.

If at step 408 the load tracking circuitry 8 detects that the RAR buffer 10 does include a valid hazarding entry, then at step 412 the load tracking circuitry 8 determines whether the skip-address-check indicator 360 is set to the first state for the hazarding entry. Also, at step 414, the load tracking circuitry 8 determines whether the load identified by UID-x is a load with acquire semantics. While steps 412 and 414 are shown in a particular sequential order in FIG. 16, they could be performed in the opposite order or in parallel.

If the skip-address-check indicator for the hazarding entry is in the second state (N at step 412) and the load identified by UID-x does not have acquire semantics (N at step 414), then at step 416 the load tracking circuitry performs an address comparison to compare the address information 154 of the hazarding entry with the address information defined for the load identified by UID-x, to determine whether the address #addH of the load represented by the hazarding entry corresponds to the address #addY of the currently processed load identified by UID-x. In some implementations, the stored address information may be defined at a coarser granularity than the granularity with which the load itself can address locations in memory (e.g. address information may be defined per cache line while memory may be byte-addressable), so the load tracking circuitry may determine that the address information corresponds even if the loads UID-x and UID-h would not actually have accessed the same byte in memory. If the address comparison at step 416 determines that the address of the hazarding entry does not correspond to the address of the current load UID-x, then again at step 410 no flush is required and the load tracking circuitry can proceed to check the next load.

However, if the address comparison at step 416 determines that the address information of the hazarding entry corresponds to the address information for the current load UID-x, then at step 418 a risk of an ordering violation is detected (due to the potential for a younger load bypassing an older load to the same address, which could breach an ordering requirement imposed by instructions at another processor), and so at least the younger load with UID-h and operations younger than UID-h (if there are any) are flushed and re-issued. In practice, to reduce circuit complexity some implementations may support a flush request mechanism which may be capable of flushing and re-issuing any operations younger than the current load being processed but may not support flushing from an arbitrary load, so it may be simpler to flush and reissue operations younger than the current load with UID-x, rather than flushing from UID-h, even though the intervening operations between loads UID-x and UID-h (in program order) may have been correct and did not require flushing. In any case, the current load UID-x itself does not need to be flushed and can be allowed to commit, since the ordering violation would only affect younger loads that bypassed the current load UID-x.

If at step 412 the skip-address-check indicator is set the first state for the hazarding entry, then step 416 of performing the address comparison can be omitted (or alternatively, the address comparison may still be performed, but its results may not be used for controlling whether to flush and re-issue operations). Hence, in the case where the hazarding entry relates to a speculatively-issued load which was speculatively issued early based on a prediction, the determination to flush and re-issue loads is made independent of an address comparison. This ensures that ordering violations which may happen when a younger load bypasses an older load on which depends (even when that older load is to a different address) can be detected and prevented from causing incorrect results to persist. Hence, if the skip-address-check indicator is determined to be in the first state at step 412, then at step 418 the flush/re-issue is triggered as described above, but this flush decision is independent of the address comparison for loads UID-x and UID-h that would be performed at step 416 for loads not subject to prediction.

The flush/re-issue is also triggered independent of address comparisons when the current load UID-x is determined at step 414 to be a load with acquire semantics (a load of a type which indicates that it should not be bypassed by younger loads even if the younger loads have a different address). Although architecturally the load with acquire semantics requires that the load should not be bypassed by any younger loads, performance can be improved by enabling younger loads to bypass the load with acquire semantics anyway, as long as they do not cause a different results to the result which would have been achieved if the load with acquire semantics was executed before any younger load. Hence, by enabling younger loads to bypass the load with acquire semantics, but including checks 408 and 414 to detect whether a younger load has had its target data change in the period between being loaded by the younger load and the older load with acquire semantics loading its data, incorrect effects caused by reordering around a load with acquire semantics can be detected and addressed by triggering the flush and re-issue at step 418 if necessary.

While FIG. 16 shows a particular sequential series of steps, it will be appreciated that similar results could be obtained by performing the steps in a different order or with some steps performed in parallel.

Figure 17:
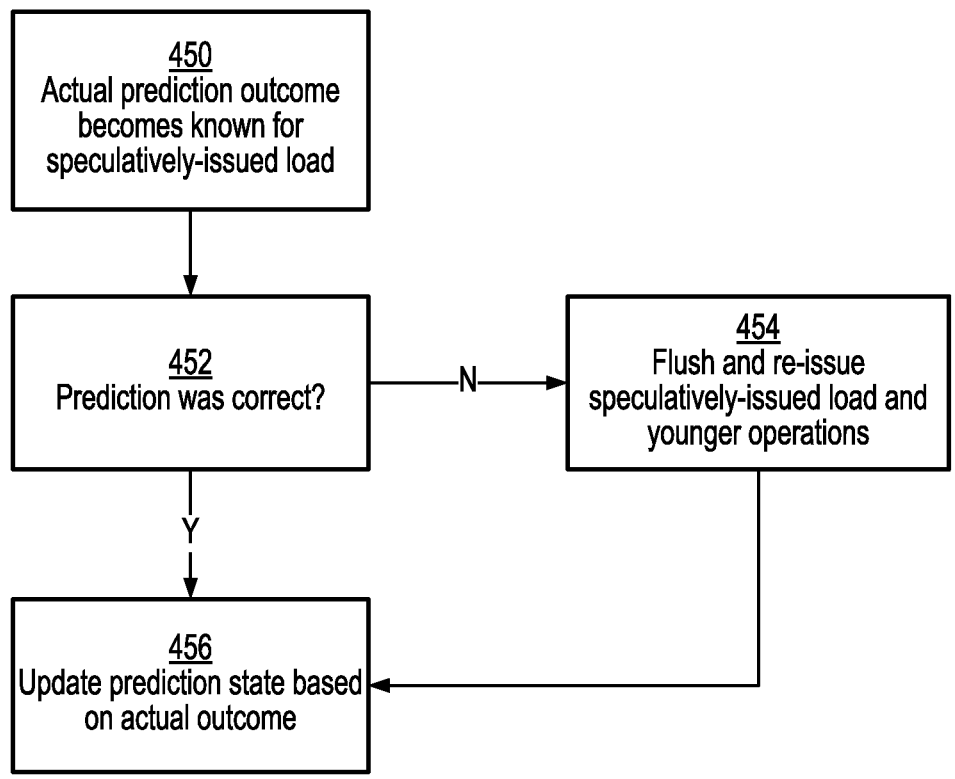
FIG. 17 is a flow diagram illustrating checking of whether the prediction is correct.

FIG. 17 is a flow diagram illustrating a method of resolving the actual prediction outcome when it becomes known for a speculatively-issued load. At step 450 the actual prediction outcome is determined. For example, for an address-predicted load this may be when the address operands become available for calculating the target address of the speculatively-issued load. At step 452 the load prediction circuitry 14, 300, 320 determines whether the prediction was correct. If not, then at step 454 the load prediction circuitry triggers flushing and re-issuing of at least the speculatively-issued load operation and any younger operations (if there are any such younger operations already issued). For some types of prediction (e.g. value prediction), all operations younger than the mispredicted load may be flushed and re-issued. Step 454 is not required if the prediction was correct. Regardless of whether the prediction is correct, at step 456 the prediction state information used to generate predictions is updated based on the actual outcome, either to reinforce prediction state information that yielded correct predictions, or to correct prediction state which gave an incorrect prediction.

Figure 18:
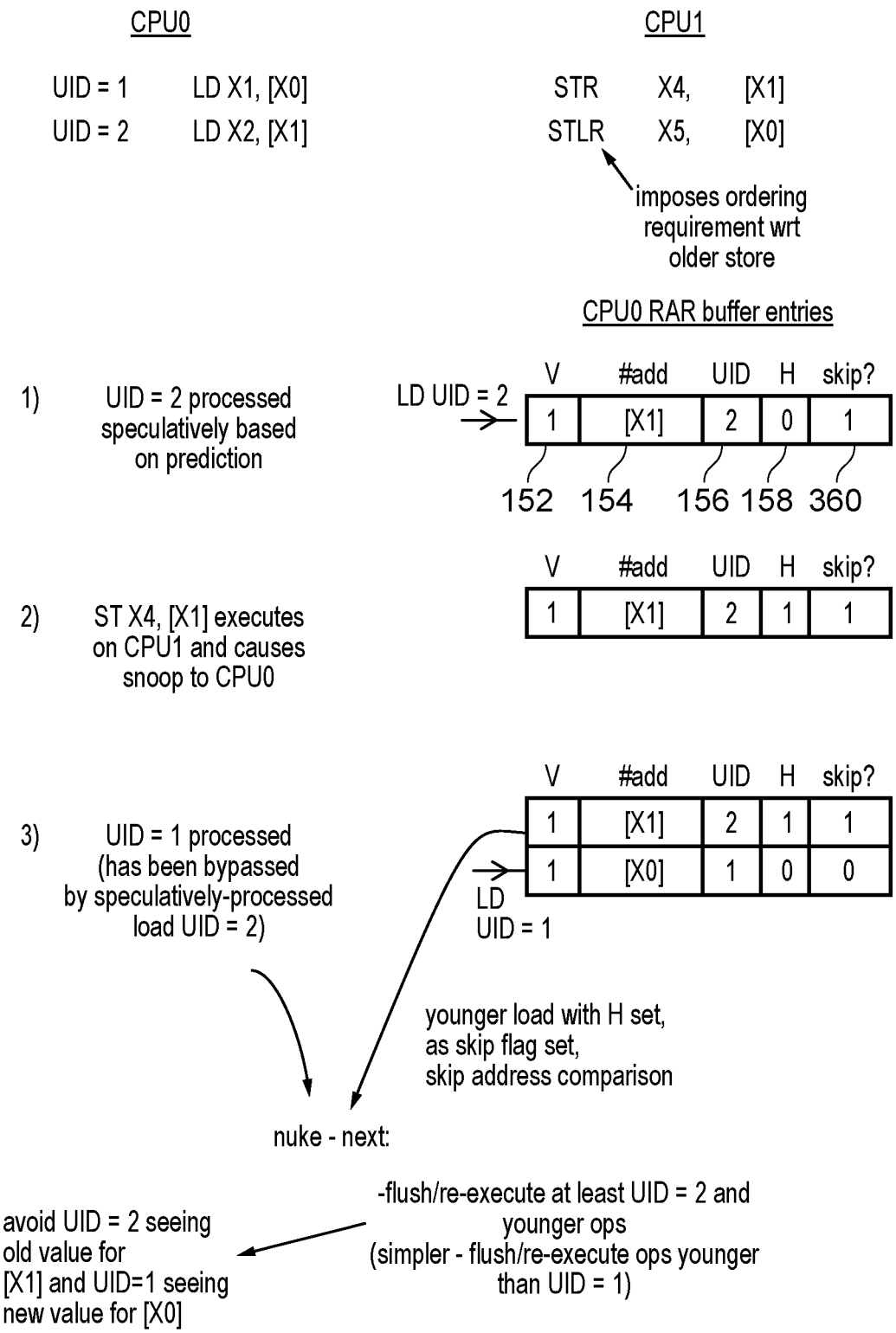
FIG. 18 is a worked example illustrating use of the load tracking information to detect the ordering violation.

FIG. 18 illustrates a worked example showing how applying the approach shown above can help to detect ordering violations caused by address prediction. Consider an example where two CPUs 0 and 1 are executing the following load/store instructions:

| CPU 0 | CPU 1 |
|---|---|
| UID = 1 LD X1, [X0] | STR X4, [X1] |
| UID = 2 LD X2, [X1] | STLR X5, [X0] |

Here, the notation [X0] means an address calculated based on the value in register X0. As in the earlier examples, for ease of understanding, we assume that the address calculated based on register X0 at CPU0 matches the address calculated based on register X0 at CPU1 (and similarly matching of the addresses calculated based on the registers X1 at CPU 0 and CPU1), even though the same ordering violation problem could arise even if CPU 1 was using a different register to provide the operands used to calculate a store address which matches a load address for a load operation processed at CPU 0. The STLR instruction is a store-with-release instruction which has "release semantics" (complementary to the "acquire semantics" for loads as discussed above). A store with release semantics imposes an ordering requirement with respect to older store operations so that the store with release semantics should not bypass any older store (even if that store is to a different address to the store with release semantics), or at least the results seen by both processor cores as a whole should not be different to the result which would be achieved if the store with release semantics had not been bypassed by any older store at CPU 1.

At step 1 in the example of FIG. 18, while the load with UID=1 is stalled, the load with UID=2 is speculatively processed based on an address prediction for [X1] so that load UID=2 can break the dependency and bypass the older load UID=1. The load tracking circuitry 8 allocates an RAR buffer entry as shown, which has the valid flag 152 set and the address information 154 set based on the predicted address—for this example we assume the predicted address corresponds to the value of X1 that would arise if it was set by the first load UID=1 based on the new data set for [X0] by the STLR instruction at CPU 1. The age indication field 156 is set to indicate UID=2. The hazard flag 158 initially clear. The address-check-skip indication 360 set to 1 (first state) to indicate that this is a load which was speculatively issued based on a prediction.

At step 2 in the example of FIG. 18, the first store operation executes on CPU 1, which causes a snoop request specifying the address [X1] to be sent to CPU 0. This is detected by the load tracking circuitry 8 which detects that there is a RAR buffer entry with the address information corresponding to [X1] and sets the corresponding hazard flag 158. Although not shown in FIG. 18, the store with release semantics may then be executed to update [X0] before UID=1 is processed.

At step 3 in the example of FIG. 18, the older load with UID=1 is processed at CPU 0 having been bypassed by the speculative-processed load. This risks an ordering violation because the younger load UID=2 has loaded old data for [X1] before the update made at step 2, while the older load UID=1 sees new data for [X0] updated by the store-withrelease instruction. As the prediction for [X1] was based on the new data for [X0], the prediction will be determined to be correct and so the prediction resolution steps of FIG. 17 would not cause any flush of UID=2. Nevertheless, despite the correct prediction, there is a risk of breaking the ordering required by the release semantics for the store-with-release, since the load with UID=2 has seen an old value for address [X1] (prior to the first store at CPU 1) but has read an address that should only have been read if the store-with-release instruction STLR has already executed at CPU 1, so effectively this has caused the older store at CPU 1 to have its effect seen as occurring after the STLR has already occurred, contrary to the release semantics required by the STLR instruction. Note that CPU 0 has no way of checking whether CPU 1 is actually executing such a store with release semantics (or other pattern of instructions imposing an ordering requirement), but triggers flushing/re-issuing when a scenario is detected at CPU 0 which could risk an ordering violation if there was such an ordering requirement at CPU 1.

Therefore, at step 3, when the older load UID=1 is processed, as well as allocating a new RAR buffer entry for UID=1, the load tracking circuitry 8 looks up existing entries and checks whether there is a valid hazarding entry which relates to a younger load and has the hazard flag 158 set. This is the case because there is a valid entry for load with UID=2 with the hazard flag 158 set. As the address-check-skip indication 360 is also set, the hazarding check between the loads UID=1, UID=2 is performed independent of the address comparison, and so despite the addresses [X0], [X1] of the loads not corresponding, a flush is still triggered. At least the speculatively-issued load UID=2 (and younger operations if any), and possibly also loads younger than the load UID=1 but older than load UID=2, are flushed and re-issued, to avoid the potential ordering violation described above.

An advantage of the approach shown above (where an address-check-skip indication 360 is set for a speculatively-processed load and used to cause the address comparison to be ignored when hazarding against an older load at the time of looking up the RAR buffer 10 for the older load) is that this avoids the need for a confirmation load to be issued when resolving the prediction, merely for triggering a lookup of the RAR buffer. Instead, the actions at the time of resolving the prediction can trigger a flush if the prediction is correct, without needing to look up the RAR buffer. The lookup of the RAR buffer, for performing the hazarding check to check for potential ordering violations caused by the prediction, can be done at the time of allocating a new entry for the older load involved in the hazarding check, rather than needing a confirmation load for the younger speculatively-issued load when resolving the correct prediction outcome. This can be helpful because it reduces pressure for bandwidth in load processing queues, saving slots which can be used by other non-confirmation loads which require processing. This can help improve performance.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Further examples are set out in the clauses below:
1. An apparatus comprising:
   processing circuitry to issue load operations to load data from a data store;
   load tracking circuitry to maintain tracking information for one or more load operations issued by the processing circuitry; and
   value prediction circuitry to determine a predicted value of first target data to be loaded from the data store by a value-predicted load operation specifying a first target address, to allow a dependent operation which depends on the first target data to be speculatively issued before an actual value of the first target data is loaded from the data store in response to the value-predicted load operation; in which:

in response to the actual value of the first target data becoming available for the value-predicted load operation, at least one of the load tracking circuitry and the value prediction circuitry is configured to:
  determine whether the actual value of the first target data matches the predicted value of the first target data determined by the value prediction circuitry for the value-predicted load operation;
  determine whether the tracking information indicates that, for a given load operation younger than the value-predicted load operation and issued before the actual value of the first target data was available, there is a risk of second target data associated with a second target address of the given load operation having changed after the second target data was loaded by the given load operation; and
  independent of whether the first target address corresponds to the second target address, request re-processing of at least the given load operation when the actual value of the first target data is determined to match the predicted value of the first target data and the tracking information is determined to indicate that there is a risk of the second target data having changed after the second target data was loaded by the given load operation.

2. The apparatus according to clause 1, in which when a mismatch is detected between the actual value of the first target data and the predicted value of the first target data, said at least one of the load tracking circuitry and the value prediction circuitry is configured to request re-processing of at least one operation younger than the value-predicted load operation.

3. The apparatus according to clause 2, in which, when the mismatch is detected between the actual value of the first target data and the predicted value of the first target data, said at least one of the load tracking circuitry and the value prediction circuitry is configured to request re-processing of the at least one operation, independent of whether the tracking information indicates that there is a risk of target data loaded by a younger load operation younger than the value-predicted load operation having changed after being loaded by the younger load operation.

4. The apparatus according to clause 1, in which when, for the value-predicted load operation, the actual value of the first target data is determined to match the predicted value of the first target data and the tracking information is determined to indicate that there is a risk of the second target data having changed after the second target data was loaded by the given load operation, said at least one of the load tracking circuitry and the value prediction circuitry is configured to request re-processing of any already issued load operation younger than the value-predicted load operation.

5. The apparatus according to clause 1, in which:
  in response to a non-value-predicted load operation specifying a third target address, where the non-value-predicted load operation does not impose a memory ordering requirement on younger load operations specifying a different target address to the third target address:
    when the tracking information indicates that there is a risk of target data loaded by a younger load operation younger than the non-value-predicted load operation having changed after being loaded by the younger load operation, the load tracking circuitry is configured to determine whether to request re-processing of at least the younger load operation, depending on whether a target address of the younger load operation corresponds to the third target address of the non-value-predicted load operation.

6. The apparatus according to clause 1, in which the load tracking circuitry is configured to maintain, as the tracking information, a tracking structure comprising one or more tracking entries, each tracking entry allocated for an issued load operation specifying at least:
  an age indicator indicative of relative age of the issued load operation;
  address information indicative of an address of the issued load operation; and
  a hazard indication indicative of whether a hazard condition has been detected for the issued load operation.

7. The apparatus according to clause 6, in which the load tracking circuitry is configured to set the hazard indication for a given tracking entry of the tracking structure to indicate that the hazard condition has been detected, in response to detecting a coherency snoop request specifying a snoop address corresponding to the address information specified by the given tracking entry.

8. The apparatus according to clause 6, in which said at least one of the load tracking circuitry and the value prediction circuitry is configured to determine that the tracking information indicates that there is a risk of the second target data having changed after being loaded by the given load operation when the tracking structure includes a hazarding tracking entry for which the age indication indicates a younger load operation than the value-predicted load operation and the hazard indication indicates that the hazard condition has been detected for the younger load operation.

9. The apparatus according to clause 1, comprising a plurality of processing elements each having access to a shared data store, each processing element comprising the processing circuitry, and at least one of said plurality of processing elements comprising the load tracking circuitry and the value prediction circuitry.

10. A method comprising:
  maintaining tracking information for one or more load operations issued to load data from a data store;
  determining a predicted value of first target data to be loaded from the data store by a value-predicted load operation specifying a first target address, to allow a dependent operation which depends on the first target data to be speculatively issued before an actual value of the first target data is loaded from the data store in response to the value-predicted load operation; and
  in response to the actual value of the first target data becoming available for the value-predicted load operation:
    determining whether the actual value of the first target data matches the predicted value of the first target data determined by the value prediction circuitry for the value-predicted load operation;
    determining whether the tracking information indicates that, for a given load operation younger than the value-predicted load operation and issued before the actual value of the first target data was available, there is a risk of second target data associated with a second target address of the given load operation having changed after the second target data was loaded by the given load operation; and independent of whether the first target address corresponds to the second target address, requesting re-processing of at least the given load operation when the actual value of the first target data is determined to match the predicted value of the first target data and the tracking information is determined to indicate that there is a risk of the second target data having changed after the second target data was loaded by the given load operation.

11. An apparatus comprising:
processing circuitry to issue load operations to load data from a data store;
load tracking circuitry to maintain tracking information for one or more load operations issued by the processing circuitry; and
load prediction circuitry to determine a prediction for a predicted load operation specifying a first target address, to allow a dependent operation which depends on the predicted load operation to be speculatively issued based on the prediction before it is known whether the prediction is correct; in which:
at least one of the load tracking circuitry and the load prediction circuitry is configured to:
determine whether the prediction for the predicted load operation is correct;
determine whether the tracking information indicates that, for a given load operation younger than the predicted load operation and issued before it is known whether the prediction is correct, there is a risk of second target data associated with a second target address of the given load operation having changed after the second target data was loaded by the given load operation; and
independent of whether the first target address corresponds to the second target address, request re-processing of at least the given load operation when the prediction for the predicted load operation is correct and the tracking information is determined to indicate that there is a risk of the second target data having changed after the second target data was loaded by the given load operation.

12. The apparatus according to clause 11, in which when the prediction is determined to be incorrect, said at least one of the load tracking circuitry and the load prediction circuitry is configured to request re-processing of at least one operation younger than the predicted load operation.

13. The apparatus according to clause 12, in which when the prediction is determined to be incorrect, said at least one of the load tracking circuitry and the load prediction circuitry is configured to also request re-processing of the predicted load operation.

14. The apparatus according to clause 12, in which, when the prediction is determined to be incorrect, said at least one of the load tracking circuitry and the load prediction circuitry is configured to request re-processing of the at least one operation, independent of whether the tracking information indicates that there is a risk of target data loaded by a younger load operation younger than the predicted load operation having changed after being loaded by the younger load operation.

15. The apparatus according to clause 11, in which when, for the predicted load operation, the prediction is determined to be correct and the tracking information is determined to indicate that there is a risk of the second target data having changed after the second target data was loaded by the given load operation, said at least one of the load tracking circuitry and the load prediction circuitry is configured to request re-processing of any already issued load operation younger than the predicted load operation.

16. The apparatus according to clause 11, in which:
in response to a non-predicted load operation specifying a third target address, where the non-predicted load operation does not impose a memory ordering requirement on younger load operations specifying a different target address to the third target address:
when the tracking information indicates that there is a risk of target data loaded by a younger load operation younger than the non-predicted load operation having changed after being loaded by the younger load operation, the load tracking circuitry is configured to determine whether to request re-processing of at least the younger load operation, depending on whether a target address of the younger load operation corresponds to the third target address of the non-predicted load operation.

17. The apparatus according to clause 11, in which the load tracking circuitry is configured to maintain, as the tracking information, a tracking structure comprising one or more tracking entries, each tracking entry allocated for an issued load operation specifying at least:
an age indicator indicative of relative age of the issued load operation;
address information indicative of an address of the issued load operation; and
a hazard indication indicative of whether a hazard condition has been detected for the issued load operation.

18. The apparatus according to clause 17, in which the load tracking circuitry is configured to set the hazard indication for a given tracking entry of the tracking structure to indicate that the hazard condition has been detected, in response to detecting a coherency snoop request specifying a snoop address corresponding to the address information specified by the given tracking entry.

19. The apparatus according to clause 17, in which said at least one of the load tracking circuitry and the load prediction circuitry is configured to determine that the tracking information indicates that there is a risk of the second target data having changed after being loaded by the given load operation when the tracking structure includes a hazarding tracking entry for which the age indication indicates a younger load operation than the predicted load operation and the hazard indication indicates that the hazard condition has been detected for the younger load operation.

20. The apparatus according to clause 11, comprising a plurality of processing elements each having access to a shared data store, each processing element comprising the processing circuitry, and at least one of said plurality of processing elements comprising the load tracking circuitry and the load prediction circuitry.

21. The apparatus according to clause 11, in which the load prediction circuitry comprises value prediction circuitry to determine a predicted value of first target data to be loaded from the data store by the predicted load operation.

22. The apparatus according to clause 11, in which said at least one of the load tracking circuitry and the load prediction circuitry is configured to determine whether the prediction for the predicted load operation is correct by determining whether the predicted value of the first target data matches an actual value of the first target data loaded from the data store in response to the predicted load operation.

23. The apparatus according to clause 11, in which the load prediction circuitry comprises address prediction circuitry to determine a predicted target address of the predicted load operation.

24. The apparatus according to clause 23, in which the said at least one of the load tracking circuitry and the load prediction circuitry is configured to determine whether the prediction for the predicted load operation is correct by determining whether the predicted target address matches an actual target address determined for the predicted load operation.

25. The apparatus according to clause 11, in which the load prediction circuitry comprises memory renaming circuitry to predict whether the first target address of the predicted load operation corresponds to a store target address of an older store operation for storing store data to the data store, to allow a dependent operation which depends on the predicted load operation to be processed based on the store data of the older store operation before it is known whether the first target address actually corresponds to the store target address.

26. The apparatus according to clause 25, in which said at least one of the load tracking circuitry and the load prediction circuitry is configured to determine whether the prediction for the predicted load operation is correct based on a comparison of the store target address and the first target address once address operands of the older store operation and the predicted load operation are known.

27. A method comprising:
maintaining tracking information for one or more load operations issued to load data from a data store;
determining a prediction for a predicted load operation specifying a first target address, to allow a dependent operation which depends on the predicted load operation to be speculatively issued based on the prediction before it is known whether the prediction is correct;
determining whether the prediction for the predicted load operation is correct;
determining whether the tracking information indicates that, for a given load operation younger than the predicted load operation and issued before it is known whether the prediction is correct, there is a risk of second target data associated with a second target address of the given load operation having changed after the second target data was loaded by the given load operation; and
independent of whether the first target address corresponds to the second target address, requesting re-processing of at least the given load operation when the prediction for the predicted load operation is correct and the tracking information is determined to indicate that there is a risk of the second target data having changed after the second target data was loaded by the given load operation.

28. A non-transitory computer-readable medium to store computer-readable code for fabrication of an apparatus comprising:
processing circuitry to issue load operations to load data from a data store;
load tracking circuitry to maintain tracking information for one or more load operations issued by the processing circuitry; and
load prediction circuitry to determine a prediction for a predicted load operation specifying a first target address, to allow a dependent operation which depends on the predicted load operation to be speculatively issued based on the prediction before it is known whether the prediction is correct; in which:
at least one of the load tracking circuitry and the load prediction circuitry is configured to:
determine whether the prediction for the predicted load operation is correct;
determine whether the tracking information indicates that, for a given load operation younger than the predicted load operation and issued before it is known whether the prediction is correct, there is a risk of second target data associated with a second target address of the given load operation having changed after the second target data was loaded by the given load operation; and
independent of whether the first target address corresponds to the second target address, request re-processing of at least the given load operation when the prediction for the predicted load operation is correct and the tracking information is determined to indicate that there is a risk of the second target data having changed after the second target data was loaded by the given load operation.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:
1. An apparatus comprising:
processing circuitry to issue load operations to load data from a data store;
load tracking circuitry to maintain tracking information for one or more load operations issued by the processing circuitry; and
load prediction circuitry to determine a prediction for enabling a load operation to be speculatively issued ahead of an older load operation based on the prediction before it is known whether the prediction is correct; in which:

the load tracking circuitry is configured to:
   determine whether the tracking information indicates that there is a risk of target data, corresponding to an address of a speculatively-issued load operation which is speculatively issued based on the prediction determined by the load prediction circuitry, having changed between the target data being loaded for the speculatively-issued load operation and data being loaded for a given older load operation bypassed by the speculatively-issued load operation; and
   in response to determining that the tracking information indicates that that there is a risk of the target data having changed between the target data being loaded for the speculatively-issued load operation and data being loaded for the given older load operation, and independent of whether the address of the speculatively-issued load operation corresponds to an address of the given older load operation, request re-issuing of at least the speculatively-issued load operation, even when the prediction for the speculatively-issued load operation is correct.

2. The apparatus according to claim 1, the load tracking circuitry is configured to maintain, as the tracking information, a tracking structure comprising one or more tracking entries;
   a tracking entry allocated for a given load operation specifying at least:
      an age indicator indicative of relative age of the given load operation;
      address information indicative of an address of the given load operation; and
      a hazard indication indicative of whether a hazard condition has been detected for the given load operation.

3. The apparatus according to claim 2, in which the load tracking circuitry is configured to set the hazard indication for a given tracking entry of the tracking structure to indicate that the hazard condition has been detected, in response to detecting a coherency snoop request specifying a snoop address corresponding to the address information specified by the given tracking entry.

4. The apparatus according to claim 2, in which load tracking circuitry is configured to determine that the tracking information indicates that there is a risk of the target data having changed between the target data being loaded for the speculatively-issued load operation and data being loaded for the given older load operation bypassed by the speculatively-issued load operation, when a lookup of the tracking structure performed in response to issuing of the given older load operation determines that the tracking structure includes a hazarding tracking entry for which the age indication indicates a younger load operation than the given older load operation and the hazard indication indicates that the hazard condition has been detected for the younger load operation.

5. The apparatus according to claim 1, comprising a plurality of processors each having access to a shared data store, each processor comprising the processing circuitry, and at least one of said plurality of processors comprising the load tracking circuitry and the load prediction circuitry.

6. The apparatus according to claim 1, in which the load tracking circuitry is configured to perform, in response to the given older load operation, a lookup of the tracking information for determining whether there is a risk of the target data corresponding to the address of the speculatively-issued load operation having changed between the target data being loaded for the speculatively-issued load operation and data being loaded for a given older load operation bypassed by the speculatively-issued load operation.

7. The apparatus according to claim 1, in which:
   the tracking information for a given load operation specifies whether a hazarding check for the given load operation and another older load operation should be performed independent of an address comparison between address information of the given load operation and address information of the other older load operation; and
   for the speculatively-issued load operation, the load tracking circuitry is configured to set the tracking information to specify that the hazarding check for the given load operation should be performed independent of the address comparison.

8. The apparatus according to claim 7, in which:
   in a hazarding check between a first older load operation and a second younger load operation that bypassed the first older load operation, in response to a determination that the tracking information for the second younger load operation specifies that the hazarding check should be performed independent of the address comparison, the load tracking circuitry is configured to determine whether to flush at least the second younger load operation independent of an address comparison between addresses of the first older load operation and the second younger load operation.

9. The apparatus according to claim 1, the load tracking circuitry is configured to maintain, as the tracking information, a tracking structure comprising one or more tracking entries;
   a tracking entry allocated for a given load operation specifying at least:
      an age indicator indicative of relative age of the given load operation;
      address information indicative of an address of the given load operation;
      a hazard indication indicative of whether a hazard condition has been detected for the given load operation; and
      an address check skip indication indicative of whether a hazarding check for the given load operation and an older load operation should be performed independent of an address comparison between the address information for the given load operation and address information of the older load operation.

10. The apparatus according to claim 9, in which for a speculatively-issued load operation, the load tracking circuitry is configured to set the address check skip indication of a corresponding tracking entry to a first state indicating that the hazarding check for the speculatively-issued load operation should be independent of the comparison of the address information.

11. The apparatus according to claim 10, in which for a non-speculatively-issued load operation, the load tracking circuitry is configured to set the address check skip indication to a second state indicating that the hazarding check should be dependent on the comparison of the address information.

12. The apparatus according to claim 10, in which:
   in response to issuing of a particular load operation, the load tracking circuitry is configured to look up the tracking structure and:
      in response to determining that the tracking structure includes a tracking entry for which the age indication indicates a younger load operation than the particular load operation, the hazard indication indicates that the hazard condition has been detected for the younger load operation, and the address check skip indication is in the first state, the load tracking circuitry is configured to trigger, independent of the address comparison between address information of the particular load operation and the address information of the younger load operation, a flush to request re-issuing of at least the younger load operation; and in response to determining that the tracking structure includes a tracking entry for which the age indication indicates a younger load operation than the particular load operation, the hazard indication indicates that the hazard condition has been detected for the younger load operation, and the address check skip indication is in a second state, the load tracking circuitry is configured to determine, depending on an address comparison between address information of the particular load operation and the address information of the younger load operation, whether to trigger a flush to request re-issuing of at least the younger load operation.

13. The apparatus according to claim 1, in which the prediction provided by the load prediction circuitry is a prediction enabling the speculatively-issued load operation to bypass the given older load operation even when the speculatively-issued load operation is dependent on the older load operation.

14. The apparatus according to claim 1, in which the load prediction circuitry comprises address prediction circuitry to determine a predicted target address of the speculatively-issued load operation.

15. The apparatus according to claim 1, in which the load tracking circuitry is configured to perform, in response to a confirmation load operation issued for the first load operation in response to determining a correct outcome for the prediction, a lookup of the tracking information for determining whether there is a risk of the target data corresponding to the address of the speculatively-issued load operation having changed between the target data being loaded for the speculatively-issued load operation and data being loaded for the given older load operation bypassed by the speculatively-issued load operation.

16. The apparatus according to claim 1, in which the load prediction circuitry comprises value prediction circuitry to determine a predicted value of data to be loaded from the data store by a first load operation, and the speculatively-issued load operation comprises a second load operation dependent on the data to be loaded by the first load operation.

17. The apparatus according to claim 16, in which the value prediction circuitry comprises memory renaming circuitry to predict whether the target address of the first load operation corresponds to a store target address of an older store operation for storing store data to the data store, and when the target address of the first load operation is predicted to correspond to the store target address, to predict, as the predicted value of data to be loaded from the data store by the first load operation, the store data of the older store operation.

18. A non-transitory computer-readable medium to store computer-readable code for fabrication of an apparatus comprising:

processing circuitry to process load operations to load data from a data store;

load tracking circuitry to maintain tracking information for one or more load operations issued by the processing circuitry; and load prediction circuitry to determine a prediction for enabling a load operation to be speculatively issued ahead of an older load operation based on the prediction before it is known whether the prediction is correct; in which:

the load tracking circuitry is configured to:

determine whether the tracking information indicates that there is a risk of target data, corresponding to an address of a speculatively-issued load operation which is speculatively issued based on the prediction determined by the load prediction circuitry, having changed between the target data being loaded for the speculatively-issued load operation and data being loaded for a given older load operation bypassed by the speculatively-issued load operation; and in response to determining that the tracking information indicates that that there is a risk of the target data having changed between the target data being loaded for the speculatively-issued load operation and data being loaded for the given older load operation, and independent of whether the address of the speculatively-issued load operation corresponds to an address of the given older load operation, request re-issuing of at least the speculatively-issued load operation, even when the prediction for the speculatively-issued load operation is correct.

19. A method comprising:

maintaining tracking information for one or more load operations issued to load data from a data store;

determining a prediction for enabling a load operation to be speculatively issued ahead of an older load operation based on the prediction before it is known whether the prediction is correct;

determining whether the tracking information indicates that there is a risk of target data, corresponding to an address of a speculatively-issued load operation which is speculatively issued based on the prediction determined by the load prediction circuitry, having changed between the target data being loaded for the speculatively-issued load operation and data being loaded for a given older load operation bypassed by the speculatively-issued load operation; and in response to determining that the tracking information indicates that that there is a risk of the target data having changed between the target data being loaded for the speculatively-issued load operation and data being loaded for the given older load operation, and independent of whether the address of the speculatively-issued load operation corresponds to an address of the given older load operation, request re-issuing of at least the speculatively-issued load operation, even when the prediction for the speculatively-issued load operation is correct.

* * * * *